(12) United States Patent
Aparício et al.

(10) Patent No.: US 11,403,644 B2
(45) Date of Patent: Aug. 2, 2022

(54) AUTOMATED RULES MANAGEMENT SYSTEM

(71) Applicant: Feedzai—Consultadoria e Inovação Tecnológica, S.A., Coimbra (PT)

(72) Inventors: David Oliveira Aparício, Oporto (PT); Ricardo Jorge Dias Barata, Oporto (PT); João Guilherme Simões Bravo Ferreira, Lisbon (PT); João Tiago Barriga Negra Ascensão, Lisbon (PT); Pedro Gustavo Santos Rodrigues Bizarro, Lisbon (PT)

(73) Assignee: Feedzai—Consultadoria e Inovação Tecnológica, S.A.

( * ) Notice: Subject to any disclaimer, the term of this patent is extended or adjusted under 35 U.S.C. 154(b) by 170 days.

(21) Appl. No.: 16/898,816

(22) Filed: Jun. 11, 2020

(65) Prior Publication Data

US 2021/0142329 A1   May 13, 2021

Related U.S. Application Data

(60) Provisional application No. 62/934,302, filed on Nov. 12, 2019.

(51) Int. Cl.
*G06Q 40/00* (2012.01)
*G06Q 20/40* (2012.01)
*G06N 5/02* (2006.01)

(52) U.S. Cl.
CPC ......... *G06Q 20/4016* (2013.01); *G06N 5/025* (2013.01)

(58) Field of Classification Search
CPC ........................... G06Q 20/4016; G06N 5/025
See application file for complete search history.

(56) References Cited

U.S. PATENT DOCUMENTS

| | | | |
|---|---|---|---|
| 9,760,861 B2 * | 9/2017 | Boding | G06Q 40/02 |
| 10,333,982 B2 * | 6/2019 | Hu | H04L 63/1408 |
| 10,607,228 B1 * | 3/2020 | Gai | G06Q 20/4016 |

(Continued)

FOREIGN PATENT DOCUMENTS

| | | | | |
|---|---|---|---|---|
| WO | WO-2018193085 A1 * | 10/2018 | | G06Q 20/4016 |
| WO | WO-2019200432 A1 * | 10/2019 | | G06F 11/3065 |

OTHER PUBLICATIONS

Behravesh et al., "Rule Modeling Engine for Optimizing Complex Event Processing Patterns," 2009 IEEE International Conference of Soft Computing and Pattern Recognition, 2009 (Year: 2009).*

(Continued)

*Primary Examiner* — Alexander G Kalinowski
*Assistant Examiner* — William B. Bunker
(74) *Attorney, Agent, or Firm* — Van Pelt, Yi & James LLP

(57) ABSTRACT

In an embodiment, a process for automated rules management system includes receiving a specification of past predicted results of evaluation rules and corresponding observed outcomes. The process includes determining one or more sets of alternative activations or priorities of at least a portion of the evaluation rules, assessing the one or more sets of alternative activations or priorities of at least a portion of the evaluation rules, and optimizing result activations or priorities of at least a portion of the evaluation rules based at least in part on the assessment of the one or more sets of alternative activations or priorities.

19 Claims, 14 Drawing Sheets

Rule Set 500.1

| Rule | Activated? | Priority | Action |
|---|---|---|---|
| Rule A | Y | 2 | Decline |
| Rule B | Y | 1 | Approve |
| Rule C | Y | 3 | Review (alert) |
| Rule D | Y | 4 | Strong Approve |

Evaluation Rules 512.1 / Predicted Result 514.1 / Observed Outcome 516.1

| Transaction | Rule A | Rule B | Rule C | Rule D | Action | Fraud? | Performance |
|---|---|---|---|---|---|---|---|
| Trx 1 | -1 | -1 | 3 | (4) | Strong Approve | Yes | FN |
| Trx 2 | 2 | -1 | (3) | -1 | Review | No | FP |
| Trx 3 | 2 | -1 | -1 | (4) | Strong Approve | Yes | FN |
| Trx 4 | -1 | 1 | (3) | -1 | Review | No | FP |

Specification 510

(56) References Cited

U.S. PATENT DOCUMENTS

| | | | |
|---|---|---|---|
| 10,867,303 B1* | 12/2020 | Manapat | G06Q 20/405 |
| 2006/0282660 A1 | 12/2006 | Varghese | |
| 2009/0265211 A1 | 10/2009 | May | |
| 2010/0094765 A1 | 4/2010 | Nandy | |
| 2010/0305993 A1* | 12/2010 | Fisher | G06Q 20/4016 706/47 |
| 2012/0101930 A1* | 4/2012 | Li | G06Q 40/02 705/35 |
| 2013/0282583 A1* | 10/2013 | Siddens | G06Q 20/405 705/44 |
| 2014/0282856 A1* | 9/2014 | Duke | H04L 63/20 726/1 |
| 2015/0046332 A1 | 2/2015 | Adjaoute | |
| 2015/0178735 A1 | 6/2015 | Liu | |
| 2016/0078361 A1 | 3/2016 | Brueckner | |
| 2017/0148027 A1 | 5/2017 | Yu | |
| 2018/0285878 A1* | 10/2018 | Jayanti | G06Q 20/405 |
| 2019/0066111 A1 | 2/2019 | Bizarro | |
| 2020/0334679 A1* | 10/2020 | Sandepudi | G06N 5/025 |
| 2020/0387835 A1* | 12/2020 | Sandepudi | G06N 5/025 |
| 2021/0012349 A1* | 1/2021 | Nandy | G06N 5/027 |

OTHER PUBLICATIONS

Yu et al., "Fuzzy rule optimization for online auction frauds detection based on genetic algorithm," Electron Commer Res; Springer Science + Business Media, 2013 (Year: 2013).*

Allen et al., 1999. Using Genetic Algorithms to Find Technical Trading Rules. Journal of Financial Economics 51, 2 (1999), pp. 245-271.

Bergstra et al., 2012, Random Search for Hyper-Parameter Optimization, Journal of Machine Learning Research 13, (Feb. 2012), pp. 281-305.

Cesare Baroni Urbani, 1980, A Statistical Table for the Degree of Coexistence Between Two Species. Oecologia (Berl.) 44, (1980), pp. 287-289.

Delamaire et al., 2009, Credit Card Fraud and Detection Techniques: A Review, Banks and Bank Systems 4, 2 (2009), pp. 57-68.

Duman et al., 2011, Detecting Credit Card Fraud by Genetic Algorithm and Scatter Search, Expert Systems with Applications 38, 10 (2011), pp. 13057-13063.

Espejo et al., 2009, A Survey on the Application of Genetic Programming to Classification, IEEE Transactions on Systems, Man, and Cybernetics, Part C (Applications And Reviews) 40, 2 (2009), pp. 121-144.

Eyal Winter, 2002, The Shapley Value, Handbook of Game Theory with Economic Applications 3 (2002), pp. 2025-2054.

Gianini et al., Managing a Pool of Rules For Credit Card Fraud Detection by a Game Theory Based Approach, Future Generation Computer Systems 102 (2020), available online Sep. 3, 2019, pp. 549-561.

Ishibuchi et al., 2004, Comparison of Heuristic Criteria for Fuzzy Rule Selection in Classification Problems, Fuzzy Optimization And Decision Making 3, 2 (2004), pp. 119-139.

Ishibuchi et al., 1995, Selecting Fuzzy if-then Rules for Classification Problems Using Genetic Algorithms, IEEE Transactions On Fuzzy Systems 3, 3 (1995), pp. 260-270.

Kou et al., 2004, Survey of Fraud Detection Techniques. In IEEE International Conference on Networking, Sensing and Control, 2004, vol. 2. IEEE, pp. 749-754.

Liu et al., 2015, Automated Rule Selection for Aspect Extraction in Opinion Mining, In Twenty-Fourth International Joint Conference On Artificial Intelligence.

Ronald A. Fisher, 1936, The Use of Multiple Measurements in Taxonomic Problems, Annals Of Eugenics 7, 2 (1936), pp. 179-188.

Rosset et al., 1999, Discovery of Fraud Rules for Telecommunications—Challenges and Solutions, In Proceedings Of The Fifth ACM SIGKDD International Conference on Knowledge Discovery and Data Mining. ACM, pp. 409-413.

Tin Kam Ho, 1995, Random Decision Forests, In Proceedings of 3rd International Conference on Document Analysis and Recognition, vol. 1. IEEE, pp. 278-282.

* cited by examiner

AUTOMATED RULES MANAGEMENT SYSTEM

CROSS REFERENCE TO OTHER APPLICATIONS

This application claims priority to U.S. Provisional Patent Application No. 62/934,302 entitled AUTOMATED RULES MANAGEMENT SYSTEM filed Nov. 12, 2019 which is incorporated herein by reference for all purposes.

BACKGROUND OF THE INVENTION

Sensitive data such as credit card numbers are increasingly being transmitted over the Internet for example by point of sale systems at physical store locations, automated teller machines at bank branches as well as transactions associated with online shops and banks. Electronic security measures analyze transactional data to detect a security breach. Conventional electronic security measures typically include a machine learning model and rules defined by human experts. For example, a machine learning model and rules are used to classify and interpret transactional data to predict whether transactions are legitimate or fraudulent. Those transactions that are potentially fraudulent are forwarded to security analysts for further review. However, rule performance tends to degrade over time and become less effective at detecting security breaches. Furthermore, rules are costly to maintain because they are computationally expensive, and ineffective rules may make manual review less efficient because numerous transactions and/or false positives are forwarded to security analysts for review.

BRIEF DESCRIPTION OF THE DRAWINGS

Various embodiments of the invention are disclosed in the following detailed description and the accompanying drawings.

DETAILED DESCRIPTION

Figure 2:
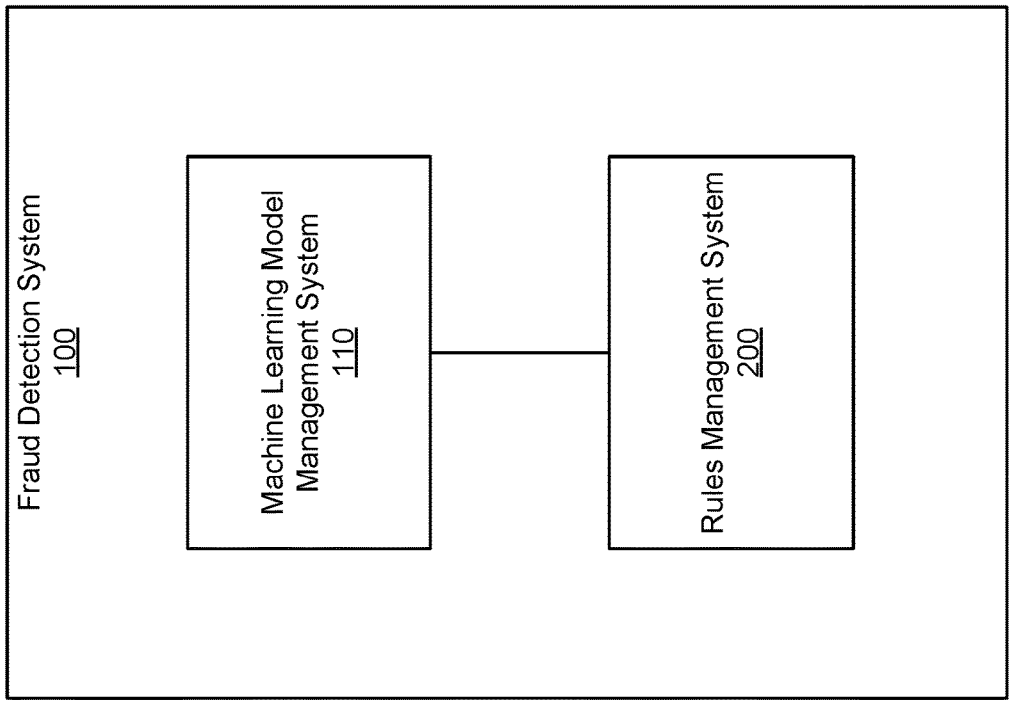
FIG. 2 is a block diagram illustrating an embodiment of a fraud detection system including a rules management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for providing automated rules management are disclosed. In one aspect, the disclosed rules management techniques accurately and efficiently assess a set of evaluation rules ("rule set") used by prediction systems to make predictions, detect events, and the like. As further described herein, the performance of a rule or rule set is a measure of how well the rule or rule set evaluates ingested data to predict an outcome. In another aspect, the disclosed rules management techniques modify a rule set for example by changing rule activations or an ordering of rules within the set to optimize the performance of the prediction system in which the rule set is used. Performance can be optimized with respect to metrics such as precision, recall, user-defined criteria (e.g., loss function, cost function, fitness, or any objective function), etc. as further described herein.

A rule set may include one or more rules that ingest data and determine an action or function to perform in response to the data. In a prediction system such as a fraud detection system, actions may include accept a transaction, decline a transaction, or generate an alert for a security analyst to further review a transaction. Characteristics of data may cause a rule to be triggered so that the rule is applied to the data to evaluate the data and output a recommended course of action. If the rule is not triggered, then the rule is not applied to the data. For example, a specific rule is triggered when a particular device is associated with a transaction so that the rule is applied to a transaction made by the particular device but the rule is not triggered/applied to a transaction associated with other devices. A rule can be de-activated (e.g., by a rules management system or administrator) so that the rule is not applied to any transaction regardless of transaction characteristics, meaning a de-activated rule never gets triggered.

Rules within a rule set may have different priorities, meaning that a rule with a higher priority is applied. In case of conflicting actions, a rule with a higher priority supersedes that of a lower priority, and the action of the higher priority rule is taken. A special type of rule called a blacklist rule can handle blacklists. Entities such as an email known to be used by a fraudster can be added to a blacklist so that transactions associated with the email are always declined.

Blacklist updater rules update blacklists and blacklist checker rules check blacklists. In various embodiments, the rules management techniques disclosed herein evaluate a rule set by taking into account overlapping rule activations with various rule priorities and blacklists.

In an embodiment, a process for providing automated rules management includes receiving an initial set of evaluation rules and corresponding observed outcomes. The evaluation rules have associated past predicted results, which are the actions suggested by applying the evaluation rules to received data. The received data may include transactions input to a fraud detection system. Example actions include accept, decline, or alert regarding a transaction. The observed outcomes are actual outcomes of a transaction such as a chargeback (a dispute with a bank to be reimbursed indicating the transaction was fraudulent) or a label applied by a security analyst or the past decision of a trained machine learning model that identifies whether a transaction was in fact fraudulent. The actions suggested by the evaluation rules (the past predicted results) can be compared with the observed outcomes to determine how well the rule set performs. For example, a rule set may be considered to perform accurately if its false negative or false positive rate is below a threshold whose value is defined at a level acceptable to a user or specific domain.

The process includes determining alternative activations or priorities of rules by modifying the initial rule set to change activations or priorities of rules within the set. The modified rule set can be assessed to determine how well the set performs. Modifications can be repeatedly performed to optimize a rule set. The disclosed rules management techniques optimize the set of active rules by determining rule activations and priorities within a rule set best suited to one or more performance criterion or user specification. In various embodiments, the rules management techniques form an optimized rule set by performing a heuristic search such as genetic programming, random search, greedy expansion, or the like. The optimized rule set can be formulated to meet a user-defined criteria. For example, the disclosed rules management techniques determine which rules to activate and priorities/orders in which to apply the rules according to a user-defined objective. The rule set may be created from a pool of rules or may be based on a pre-existing rule set as further described herein.

Figure 1:
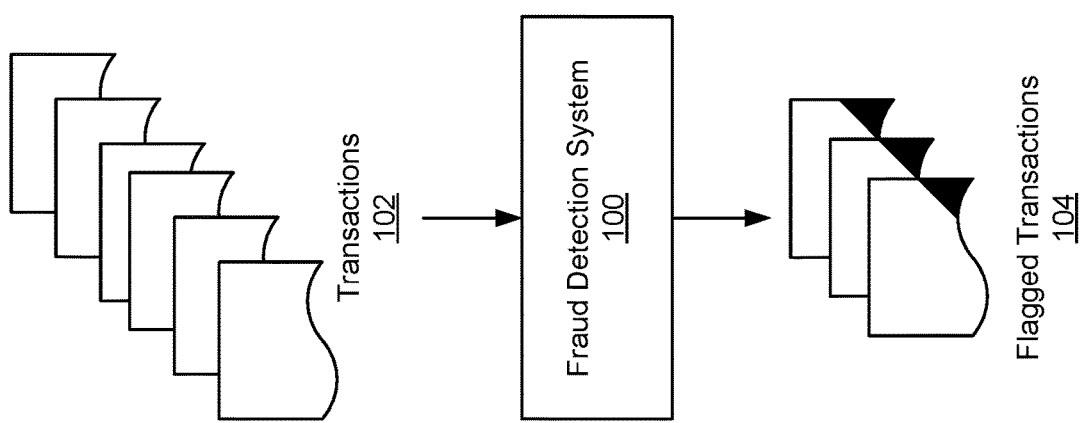
FIG. 1 is a diagram illustrating an embodiment of a fraud detection system.
Figure 3:
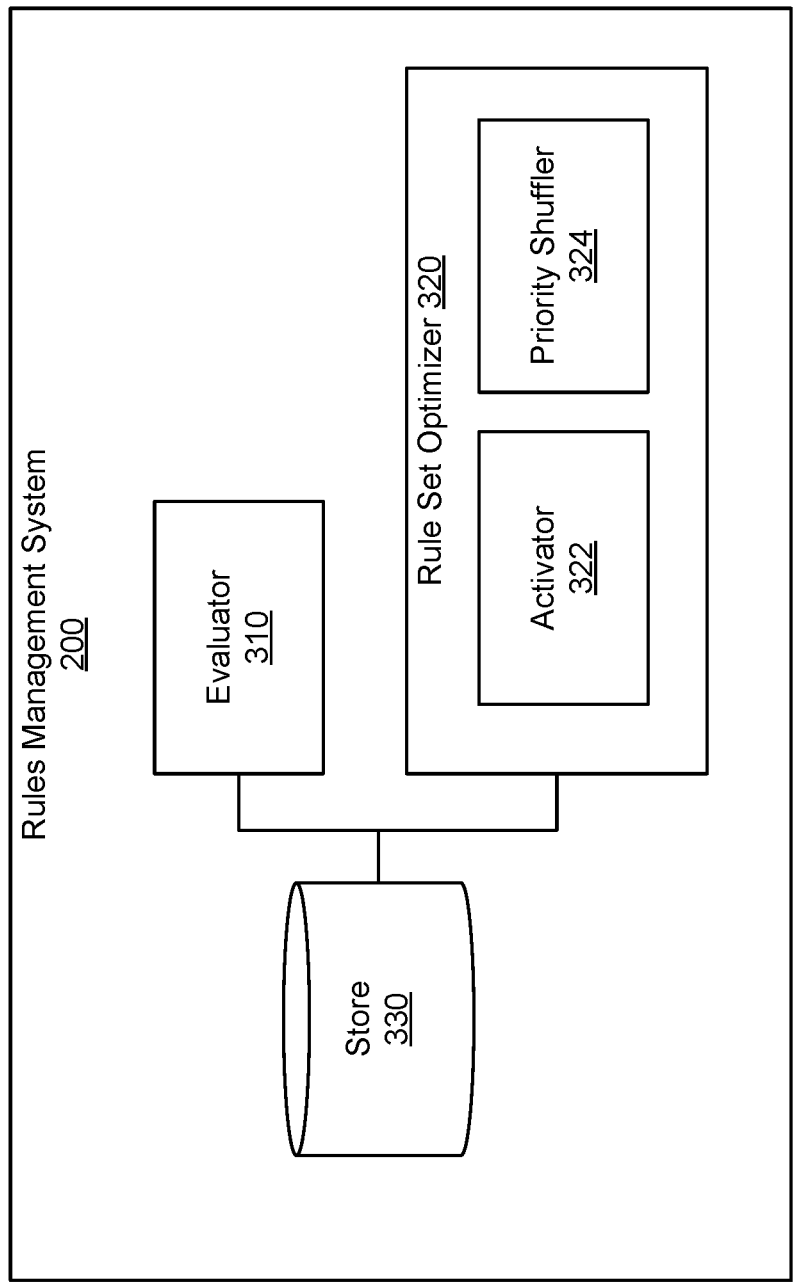
FIG. 3 is a block diagram illustrating an embodiment of a rules management system.
Figure 8:
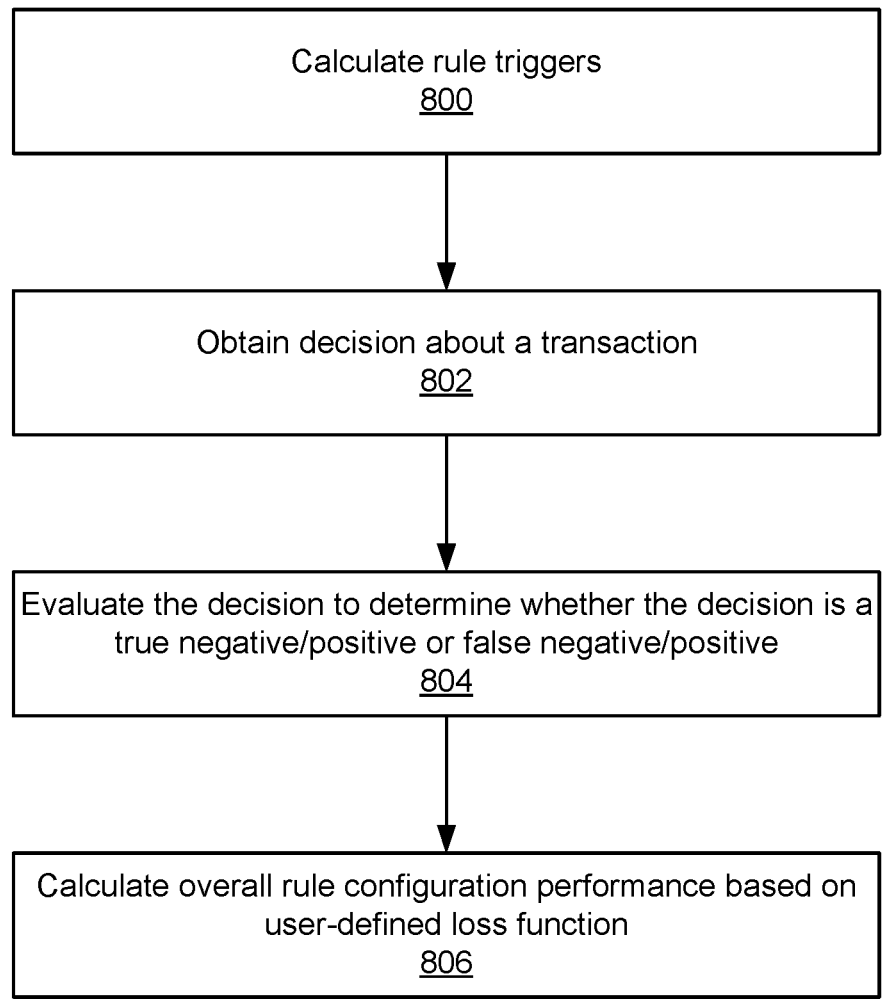
FIG. 8 is a flow chart illustrating an embodiment of a process for rule evaluation.
Figure 9:
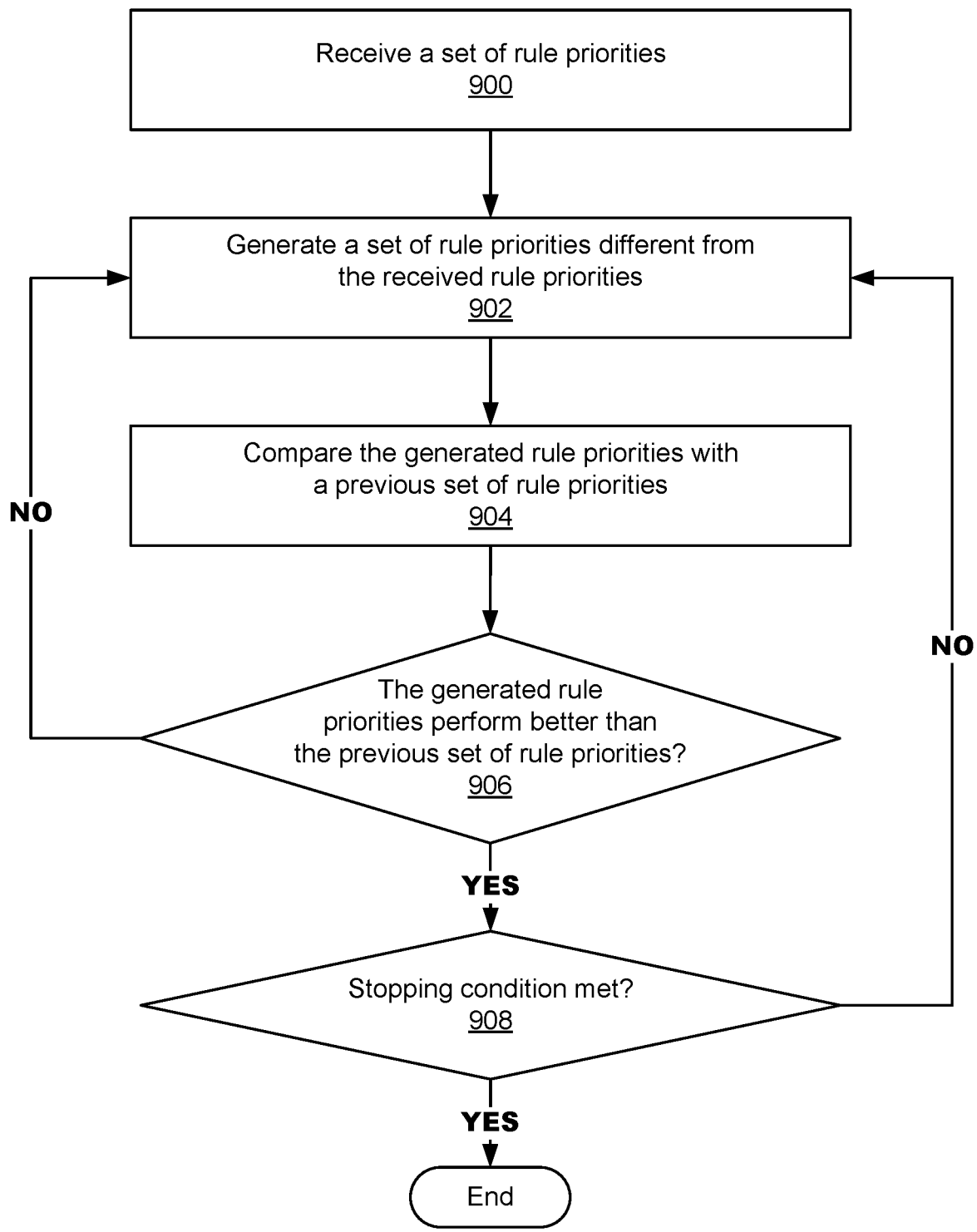
FIG. 9 is a flow chart illustrating an embodiment of a process for optimizing a rule set.
Figure 10:
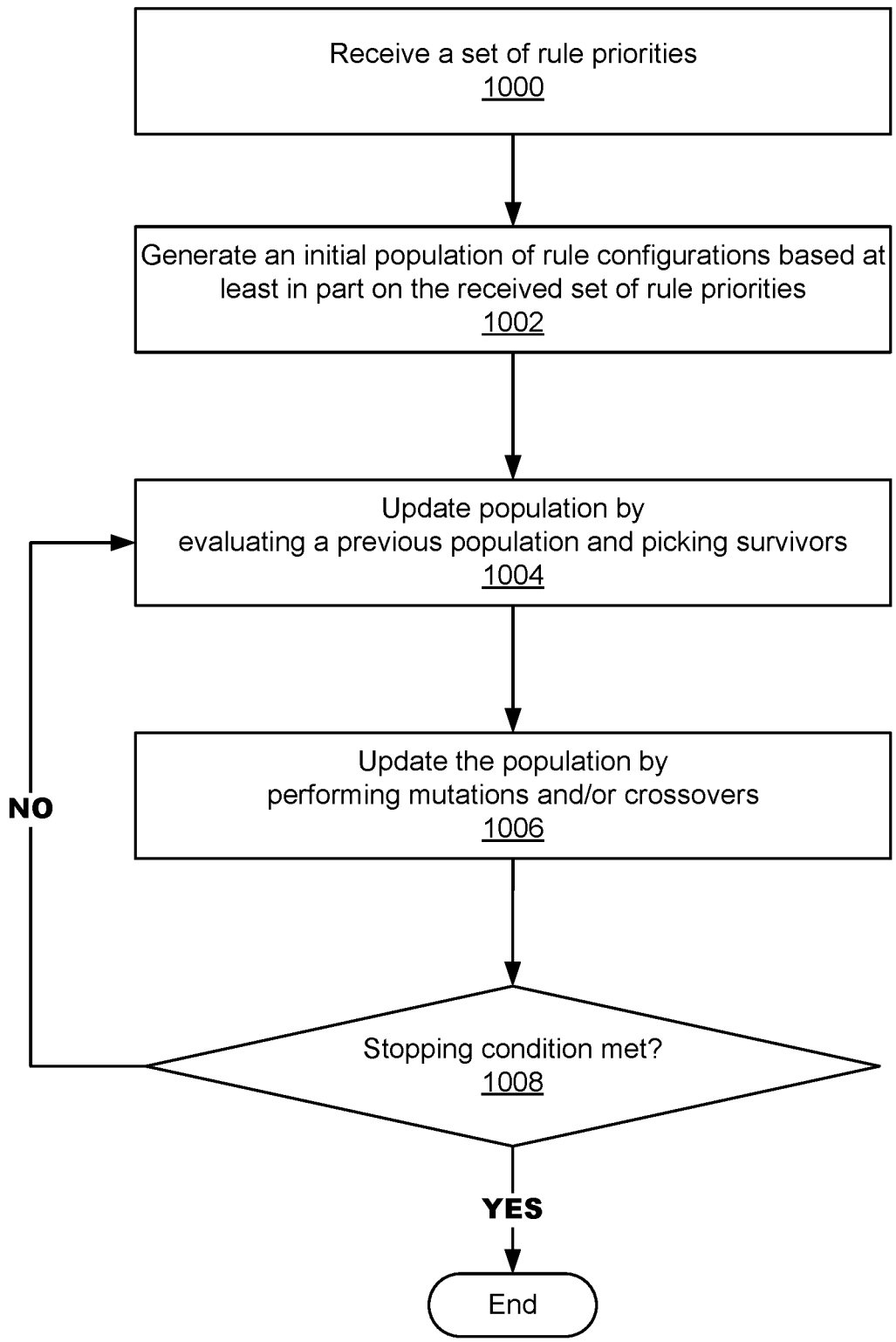
FIG. 10 is a flow chart illustrating an embodiment of a process for optimizing a rule set using genetic programming.
Figure 11:
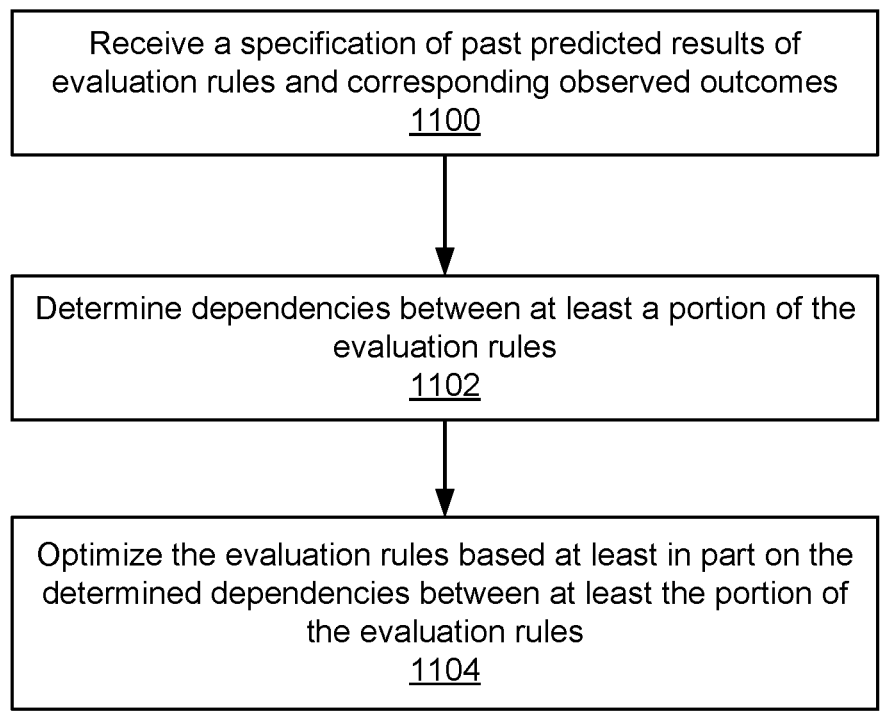
FIG. 11 is a flow chart illustrating an embodiment of a process for determining rule dependencies.
Figure 12:
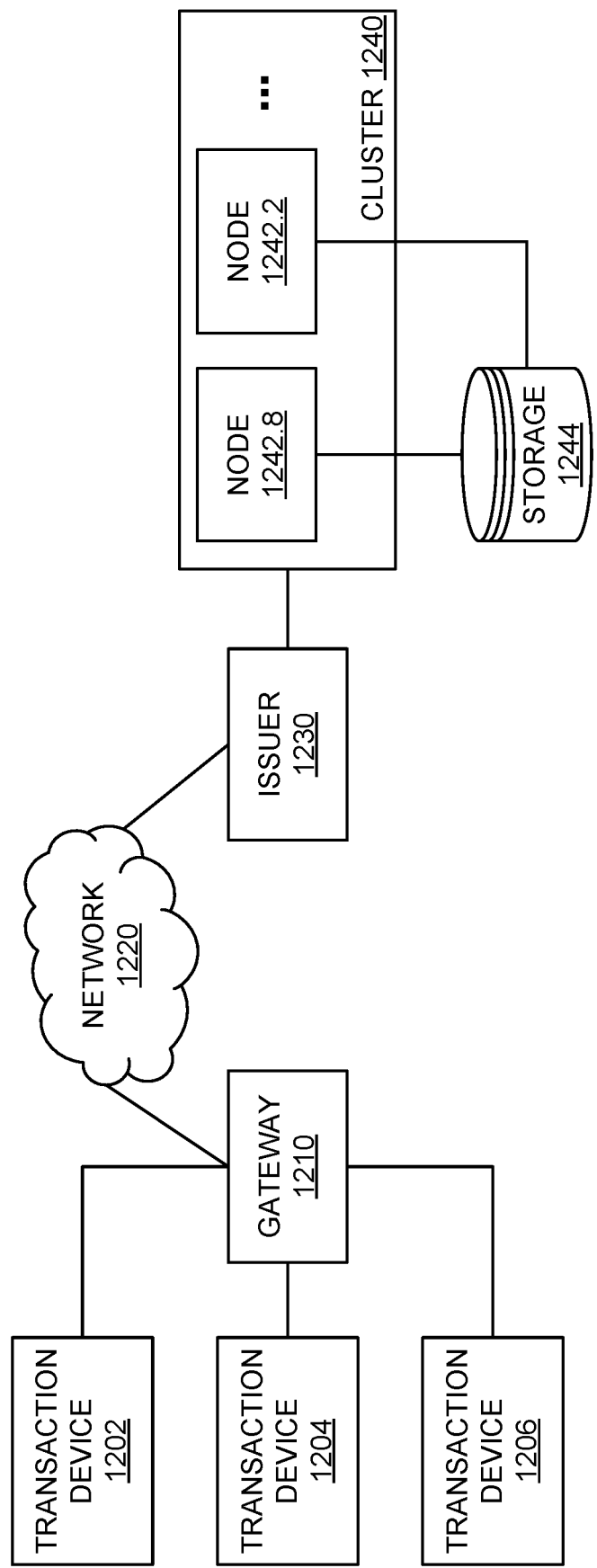
FIG. 12 is a block diagram illustrating an embodiment of a system in which automated rules management can be implemented.
Figure 13:
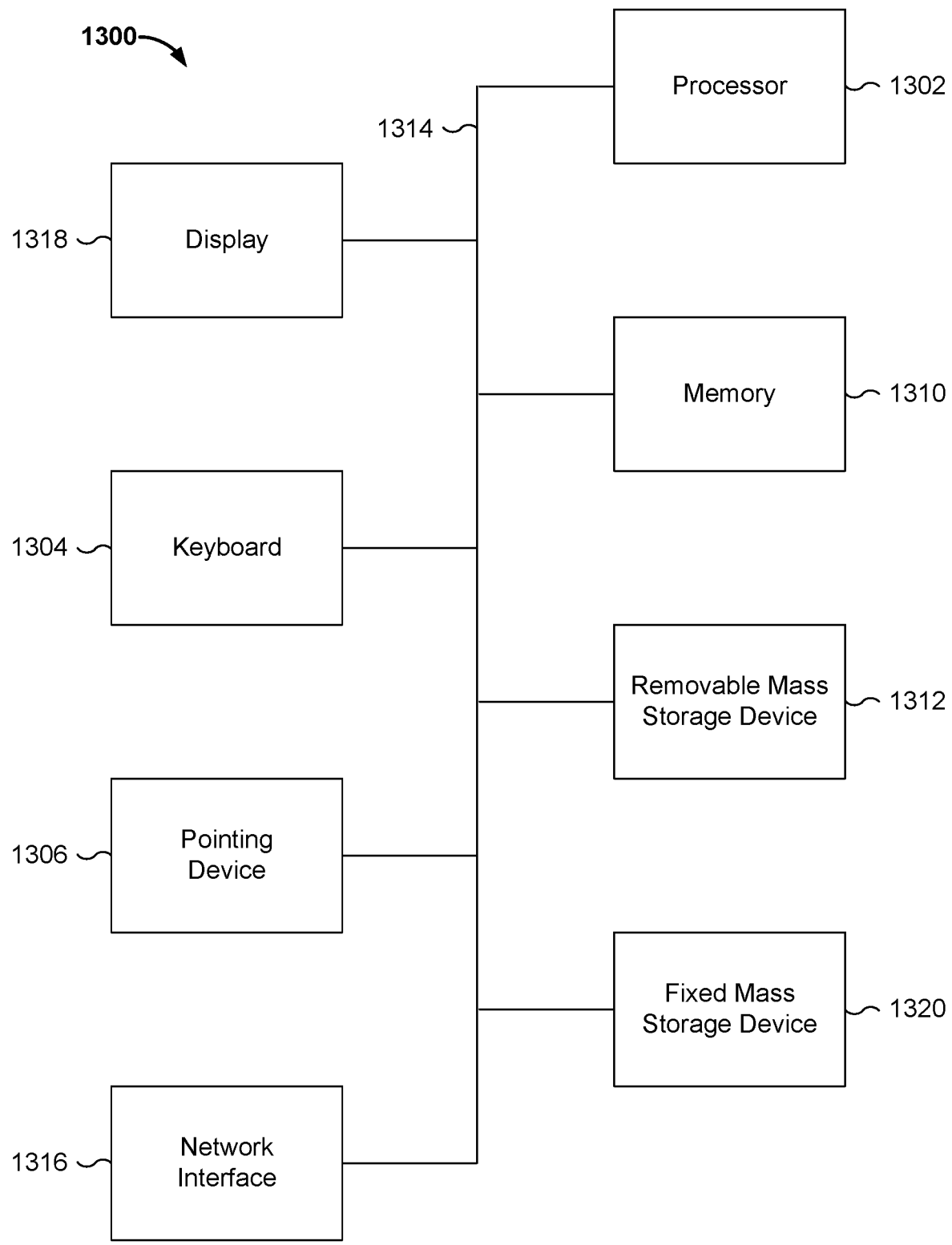
FIG. 13 is a functional diagram illustrating a programmed computer system for automated rules management in accordance with some embodiments.

First, an overview of a fraud detection system is discussed (FIGS. 1 and 2). Next, an embodiment of a rules management system is discussed (FIG. 3). Then, a process for rules management is discussed (FIGS. 4-7D). A process for evaluating a specification of past predicted results of evaluation rules and corresponding observed outcomes is discussed (FIG. 8). Some examples of optimizing rule activations or priorities are discussed (FIGS. 9-10). A process for determining rule dependencies (e.g., blacklist dependencies) is discussed (FIG. 11). An example of a context for using a fraud detection system with the rules management system disclosed herein is discussed (FIG. 12). Finally, an example of a device that can be configured to perform rules management is discussed (FIG. 13).

FIG. 1 is a diagram illustrating an embodiment of a fraud detection system. Fraud detection system 100 receives transactions 102 and processes the transactions to determine actions (if any) to take with respect to the transactions. For example, if the fraud detection system determines that a transaction is potentially fraudulent, the system outputs an alert about one or more transactions 104 that are potentially fraudulent to have the transaction(s) be reviewed further.

In various embodiments, fraud detection system 100 is designed to detect fraud and similar security breaches in online transactions such as purchases. In a typical scenario, a fraudster obtains a payment instrument (such as by using a credit card skimmer at a point of sale device) and then tries to make unauthorized purchases using that payment instrument. Sometimes the legitimate cardholder detects the illicit usage and requests a chargeback or otherwise initiates a dispute to be reimbursed. Sometimes a merchant, credit card issuer, bank, or other entity involved in transaction processing uses a fraud detection system such as fraud detection system 100 to detect and prevent fraudulent transactions.

The effectiveness of a fraud detection system depends on its ability to quickly and accurately detect and prevent a fraudster from successfully completing a purchase or transaction. An effective fraud detection system preferably detects the fraud prior to a legitimate cardholder reporting the fraud or some other financial loss to a merchant, credit card issuer, bank, or other entity involved in the transaction. Ideally, the fraudster is thwarted by having the payment instrument declined when they try to use it.

Fraud detection system 100 receives transactions 102, makes predictions about the transactions such as whether they are fraudulent or legitimate, and outputs one or more flagged transactions 104. The flagged transactions 104 may be those that are potentially fraudulent, so the fraud detection system forwards them to a human or automated analyst, who investigates the transaction and makes a final decision about what action to take. Further reviews are typically complicated, expensive, and subject to human error (if a human is involved) as they require specialized knowledge and unnecessarily delays the approval of legitimate transactions.

An overly-conservative fraud detection system blocks many or even all suspicious activity. However, such systems may prevent legitimate economic activity. The automated rules management techniques disclosed herein can be used in a fraud detection system to optimize fraud detection system 100 by adjusting the fraud detection system to a risk profile (such as preferences or needs) of a client (such as a financial institution or an online merchant) using the fraud detection system to detect fraud.

The disclosed rules management techniques can be implemented by fraud detection system 100 to better recognize fraudulent transactions and/or legitimate transactions. Merchants, customers, financial institutions, and government agencies and others who suffer fraud-related losses including credit card theft and other scams would benefit from the rules management techniques disclosed herein.

A more detailed example of an environment in which a fraud detection system can be used is shown in FIG. 12. The following figure describes an example fraud detection system 100 in more detail.

FIG. 2 is a block diagram illustrating an embodiment of a fraud detection system including a rules management system. Fraud detection system 100 is an example of a prediction system that may implement and/or use the rules management techniques disclosed herein. Fraud detection system 100 includes a machine learning model management system 110 and a rules management system 200. The disclosed techniques can be applied to a variety of systems including those that have a machine learning model and those that do not have a machine learning model. Fraud detection can be formulated as a classification task. In an example binary classification task, each transaction (such as those in the set of transactions 102) is represented as a feature vector, z, and get labeled by the fraud detection system as either fraudulent (positive class, y=1) or legitimate (negative class, y=0). The fraud detection system then makes a prediction (determines what action to take) based on the classification of the transaction.

Machine learning model management system 110 is configured to manage a machine learning model that scores a transaction. The model produces a score, e.g., $\hat{y} \in [0, 1]$, is a measure of the probability of fraud given the transaction features, e.g., $P(y=1|x)$. In various embodiments, the model is a supervised model that trains offline using historical data. The model can be updated periodically or in response to triggers such as when the disclosed techniques are applied to change rule sets.

Rules management system 200 is configured to apply a set of one or more rules to a transaction and/or associated score to determine an action to take with respect to the transaction. Rules may determine actions to take using the model score (e.g., if $\hat{y}<0.5$, then accept the transaction), and features of the transaction (e.g., if the transaction is above a threshold amount/price/quantity, then alert/decline). By way of non-limiting example actions include one or more of the following: accept the transaction, decline it, or alert it to be further reviewed by a security analyst. For simplicity, in some of the examples discussed herein, the set of possible actions are "accept, decline, or alert," but this is not intended to be limiting and other actions are possible. For example, actions have different degrees of confidence such as weak accept to strong accept with one or more levels in between. In various embodiments, the rules management system is configured to perform the process of FIG. 4 and FIGS. 9-11.

In operation, one or more optional pre-processing steps are performed. For example, a feature engineering step, $g(z)$, is applied to the raw features z of a transaction to generate processed features, x and/or a score. An example of a processed feature (e.g., a "profile") is the number of transactions for a card in the last hour. The pre-processing step(s) stores or outputs the processed feature to rules management system 200. The rules management system obtains the output of the machine learning model (e.g., processed features and a model score), and evaluates the output, e.g., applying a function $f(x, \hat{y})$, to decide between various actions to take in response to the transactions. For example, the rules management system applies rules (of a rule set) individually on incoming transactions. Transactions may trigger none, one, some, or all rules in a rule set. The rules management system outputs its decision corresponding to an action such as approving, declining, or forwarding (for further review) a transaction. The action determined by the rules management system can also be thought of as a prediction about a transaction such as whether the transaction is fraudulent or legitimate. For example, approving a transaction indicates that the rules management system considers the transaction to be legitimate, declining a transaction indicates that the rules management system considers the transaction to be fraudulent with high confidence, and forwarding a transaction for further review indicates that the rules management system suspects that the transaction may be fraudulent.

Conventional rules management systems tend to have numerous rules making them difficult to maintain, complex, and computationally expensive to use in a fraud detection system. Rules management system 200 improves upon conventional complex rule systems by making them more effective and ensures that performance objectives are met. The following figure shows an example rules management system 200 in more detail.

FIG. 3 is a block diagram illustrating an embodiment of a rules management system. Rules management system 200 encapsulates rules, their state (e.g., active or not), and a priority of a rule within a set of rules. If a rule is on/active then it can be applied to a transaction (if triggered), and if the rule is off/inactive then it cannot be applied to a transaction (regardless of whether it would trigger if active). The priority of a rule within a set of rules indicates a dominant or final action. Rules priorities can be used to resolve contradictory rule actions when a transaction triggers multiple rules with conflicting actions for example.

The rules management system is configured to activate or de-activate rules, and change rule priorities as further described below. The rules management system is configured to evaluate various sets of rules (including after combinations of activation/deactivation and changed priorities). For example, rules management system may evaluate the performance of a set of rules that a fraud detection system (such system 100 shown in FIGS. 1 and 2) uses to detect fraud.

Rules management system 200 includes evaluator 310, rule set optimizer 320, and store 330. Each of the components may be communicatively coupled to one or more other components. One or more devices may implement the functions of one or more of the components named above.

Evaluator 310 is configured to calculate performance metrics of one or more rules individually or as a set. Some examples of performance metrics include recall at a given false positive rate or false negative rate, precision, a user-defined criteria, etc. For simplicity, the disclosure refers to the user-defined criteria as a "cost function" or "loss function" but this is merely exemplary and not intended to be limiting as the criteria may include any objective function. The evaluator compares the predicted results (actions) of one or more rules or rule sets with observed outcomes, which are actual results based on labels coming from chargebacks, security analysts' decisions, historical decisions, etc. The evaluator may monitor how individual rules are impacting the system, e.g., the fraud detection and computational performance of the system. The evaluator may assess the contribution of individual rules to the performance of a rule set and/or the overall performance of the rule set. The evaluator may express the performance of one or more rules or a rule set as a score, a categorization, or the like. For example, the evaluator assesses the performance of a rule set over several transactions and determines a score reflecting how often the predicted result of the rule set matches the observed outcome. In various embodiments, the evaluator is configured to perform the process of FIG. 8 to evaluate rules.

Rules can be computationally expensive to apply to transactions for various reasons such as if they depend on profiles. A profile is an aggregate metric such as the number of transactions for a card in a window of time. Depending on the size of aggregation window, profiles can be computationally expensive to generate. For example if the aggregation window is 6 months or 1 year, there will be many transactions within the given window. The transactions are fetched and the aggregate metric (profile) is calculated. Computational expense can be reduced because some rules in a rules set may use heavy profiles, and removing some of those rules would remove the need to use (perform calculations on) the profiles.

In various embodiments, rules management system 200 includes a rule dependencies manager (not shown) configured to manage dependencies of rules. Some rules may be related to other rules and such relationships are managed by the rule dependencies manager. The dependencies may be used when evaluating rule performance. For example, a rule dependencies manager is configured to manage blacklist rules, which include blacklist updater rules that add items to a blacklist and blacklist checker rules that check whether an item is on a blacklist. A blacklist checker rule may depend on a blacklist updater rule because it was the updater rule that added the item to the blacklist. The performance of the checker rule may also be attributed to the updater rule. The rule dependencies manager may be configured to perform the process of FIG. 11.

Rule set optimizer 320 is configured to create or update a rule set to improve predictions and/or system performance. For example, rule set optimizer instructs activator 322 to activate or de-activate rules and priority shuffler 324 to change the priority of one or more rules. In various embodiments, the rule set optimizer is configured to perform the process of FIG. 9 or 10 to optimize a rule set. Activator 304 and priority shuffler 306 are shown in this example as being included in rule set optimizer 308, but this is merely exemplary and not intended to be limiting. For example, the activator and/or the priority shuffler may be external to the rule set optimizer.

Store 330 stores rules and associated information such as actions, priorities, and status (activated/deactivated). Rules in store 330 may be organized as sets of rules or otherwise indicated to be associated with each other when applied to transactions. An example of a rule set is 500.1 of FIG. 5A. In various embodiments, rules are suggested by fraud analysts, data scientists, or an automated rules suggestions system. Evaluator 310 or rule set optimizer 320 may access or manipulate the rules in store 330 to evaluate the rules, activate one or more rules, shuffle priorities of the rules, or optimize a set of rules. In various embodiments, store 330 stores results of evaluator 310 (performance of various rule sets) or rule set optimizer 320 (various rule set configurations).

As further described below, the rules management system may begin with an initial rule set and then evaluate variations of the initial rule set where the variations are created by activating or deactivating and/or changing priorities of various rules in the rule set.

In operation, evaluator 310 evaluates an initial rule set. Evaluation results may be stored in store 330 for future reference. Optimizer 320 uses rules activator 322 and priority shuffler 324 to form a new rule set by activating/deactivating or changing a priority of one or more rules in the initial rule set. The evaluator then evaluates the new rule set and compares the performance of the new rule set with the initial rule set to determine which rule set is better. Optimizer 320 may continue to perform further optimizations (e.g., modifications to a rule set) and evaluator 310 may continue to evaluate further rule sets until a performance objective such as a user-defined loss function or stopping criteria is met. Examples of stopping criteria include evaluating a certain number (e.g., 10,000) of different rule activations and priorities or reaching a point where performance is not improving above a certain performance threshold (e.g., improve at least 0.1% recall at 5% false positive rate).

Conventional rules management systems do not efficiently and effectively evaluate and optimize complex rule sets. As further described below, experimental results show that the disclosed rules management techniques minimize the number of rules and false negatives/false positives while maintaining desired performance (e.g., recall). The disclosed techniques can reduce the number of active rules while maintaining system performance and even remove rules that depend on expensive aggregations such as the average amount of a user's transactions in the last month.

Figure 4:
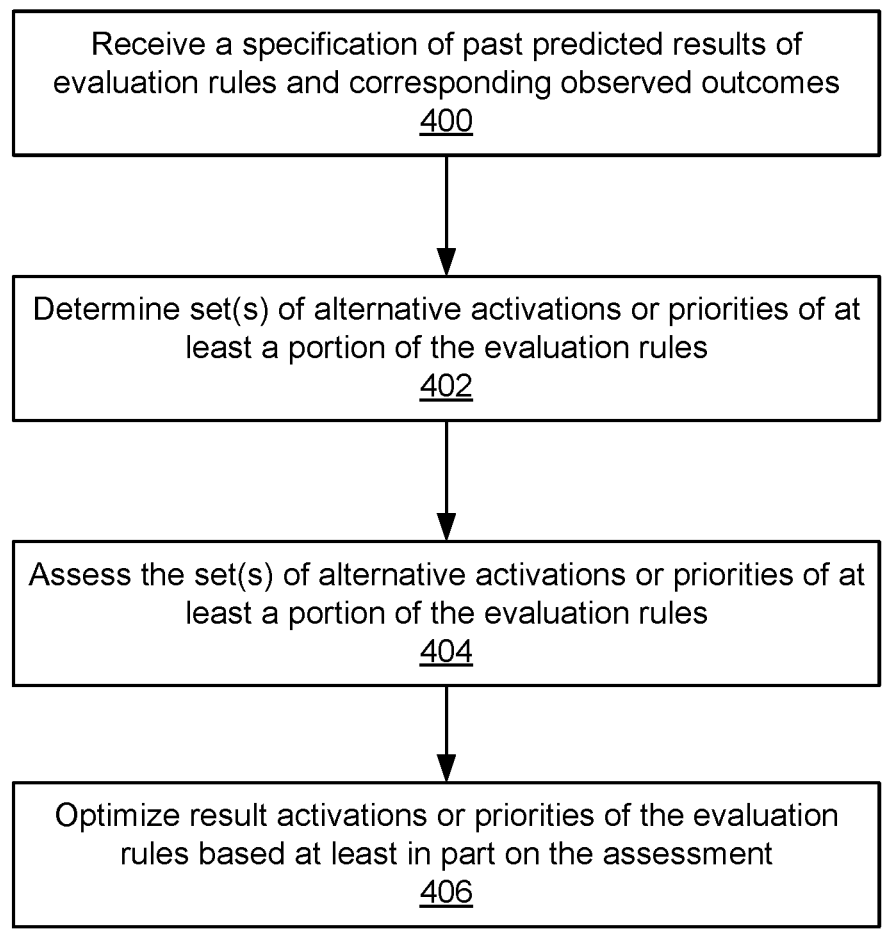
FIG. 4 is a flow chart illustrating an embodiment of a process for automated rules management.

FIG. 4 is a flow chart illustrating an embodiment of a process for automated rules management. The process begins with an initial set of one or more rules, alters the initial set of rule(s), assesses the performance of the altered set, and optimizes the altered set by further altering the set if desired. The resulting optimized rule set makes better predictions and/or better meets a performance objective compared with the initial rule set. The process may be performed by a processor such as evaluator 310 or processor 1302. The process will be explained with the aid of FIGS. 5A-6B, which show example rule sets and FIGS. 7A-7D, which are conceptual diagrams of inputs and outputs at various stages of the rules management process.

The process begins by receiving a specification of past predicted results of evaluation rules and corresponding observed outcomes (400). The specification of past predicted results of evaluation rules includes a set of evaluation rules and predicted results of the evaluation rules. The set of evaluation rules includes one or more rules that can be applied to data to make predictions about the data. For example, in a fraud detection system, the evaluation rules are applied to transactional data to predict whether a transaction is fraudulent or not. The past predicted results of the evaluation rules refer to the actions/determinations made by the evaluation rules on data from the past and for which there are observed actual outcomes indicating whether the transaction turned out to be fraudulent or not. The types of actions/determinations made by the evaluation rules may be domain-specific. Referring again to the fraud detection case, actions may include accept a transaction, decline a transaction, or generate an alert to perform further review of a transaction. The observed outcomes may be obtained in a variety of ways including by conventional methods such as assessment by a security analyst or data scientist who determines a true label for a transaction.

In various embodiments, the received specification includes an assessment of the performance of the set of evaluation rules. Alternatively or in addition, the process assess the received specification. The performance of evaluation rules (a rule set or portion thereof) may be assessed by comparing the past predicted results with observed outcomes. A rule set that performs well would predict results that are similar to the observed outcomes, while a rule set that performs poorly would predict results that are different from the observed outcomes (false positives and false negatives). For example, a rule set that does not perform well would accept a transaction when the observed outcome is a chargeback. In other words, rule sets that tend to generate more (above some threshold number) false positives or false negatives perform relatively poorly. For example, in a fraud case, the threshold may be based on a cost function that maximizes recall subject to not increasing the number of false positives (e.g., the FPR threshold is below 10%, the FPR threshold increases less than some amount such as no more than 10% where it used to be 5%, or the FPR remains the same as before). As further described below, rule set performance can be assessed in various ways and assigned a score or category (e.g., good, fair, poor). An example evaluation process is shown in FIG. 8.

Figure 5A:
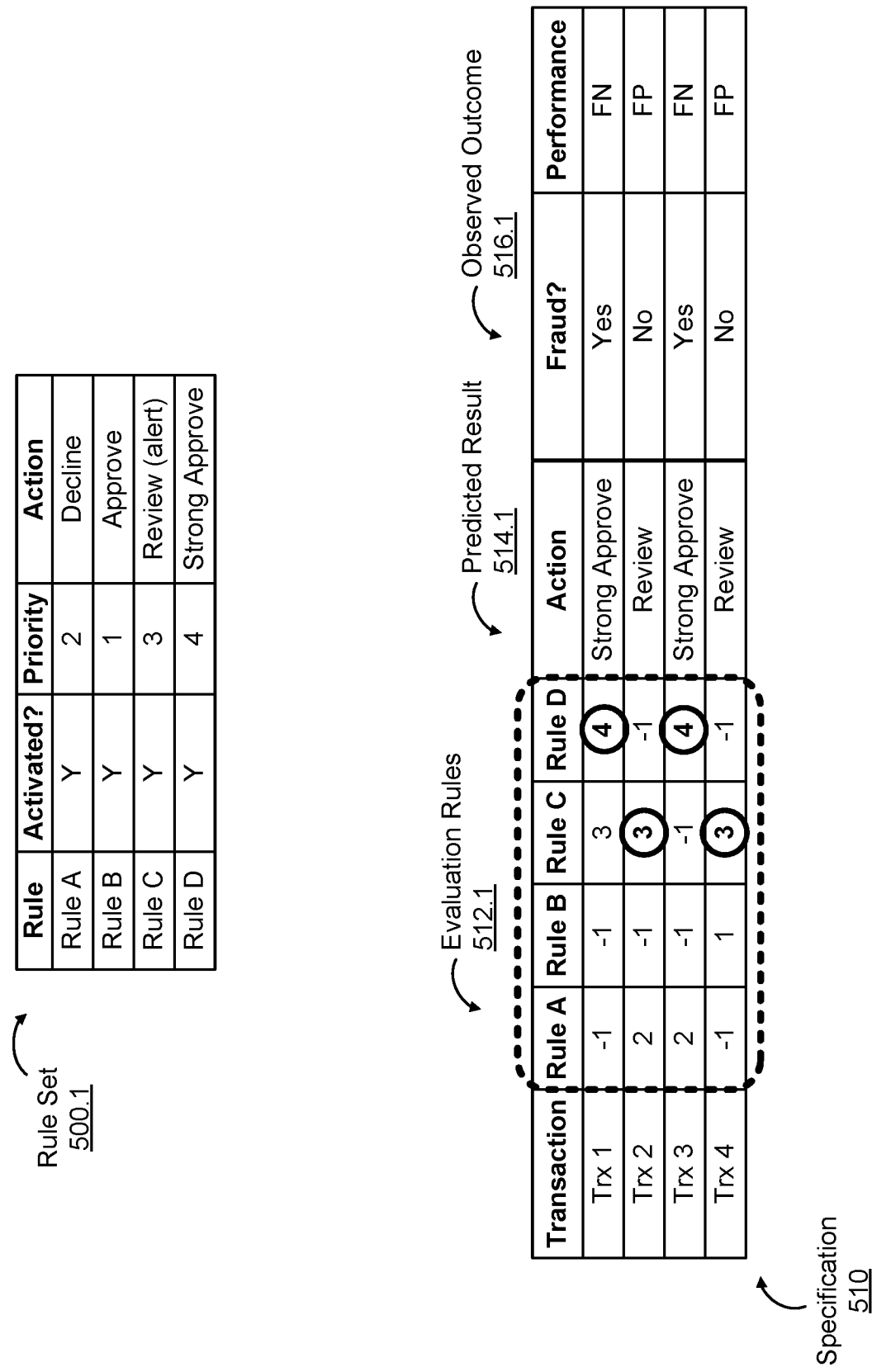
FIG. 5A shows an example of an initial rule set.

FIG. 5A shows an example of an initial rule set. The initial rule set 500.1 includes four rules, Rule A, Rule B, Rule C, and Rule D and their associated actions. A rule may determine the action by checking if any/all conditions in an if/else structure are met or by traversing a decision tree to arrive at the action given characteristics of the transaction for example. For example, if a transaction amount is greater than X and a user is Y or if the amount is greater than 2 X, then the rule determines that the transaction is fraudulent and takes an appropriate action. For simplicity, the details of arriving at the action are not discussed as the disclosed rules management techniques can be applied to any type of rule regardless of their semantics and syntax. When assessing incoming transaction data, Rule A determines that the transaction should be declined, Rule B determines that the transaction should be approved, Rule C determines that the transaction should be further reviewed so it generates an alert, and Rule D determines that the transaction should be approved with high confidence.

A rule can be activated (turned on) or de-activated (turned off). A rule that is de-activated will not be triggered by the data so that it will not be applied as further described with respect to FIG. 5B. In this example, all four rules are activated so that if an incoming transaction meets a rule's criteria, then the rule is triggered and applied to evaluate the transaction to determine an action to take with respect to the transaction.

If there are conflicts between actions in a rule set, the rule with the higher priority controls the action taken by the rule set. Referring to rule set 500.1, suppose Rule A and Rule B are both triggered, but their actions conflict (decline vs. approve). Their priorities are taken into consideration so that Rule A, which has the higher priority (2 is higher than 1 in this example) controls the outcome of the rule set, which is to approve a transaction. The priority of a rule may be determined based on domain knowledge such as a fraud analyst, a user, or some other pre-defined settings. Suppose a user (e.g., bank/client) typically gives higher priority to decline rules than accept rules. However, some high priority rules are implemented to guarantee that users in a whitelist are not blocked even if they show suspicious behavior. Those users might be known to be good but make a high volume of transactions which, typically, would signal abnormal behavior.

Specification 510 shows an example of a table of past predicted results 514.1 of evaluation rules 512.1 and corresponding observed outcomes 516.1. Specification 510 includes four transactions (Trx 1, Trx 2, Trx 3, and Trx 4) and the predicted result obtained by applying evaluation rules 512.1 to each transaction. Evaluation rules 512.1 correspond to rule set 500.1.

Features or characteristics can be extracted from a transaction to determine which rules in a rule set trigger for the transaction as further described below. Referring to the row corresponding to transaction Trx 1, Rules A and B are not triggered, which is represented by "−1" in their respective cells. Rules C and D are triggered, and the values in their cells represent the rule priority as indicated by rule set 500.1. The action for Rule C is "alert," which will send the transaction for further review (because Rule C suspects the transaction could be fraudulent). The action for Rule D is "strong approve," which allows the transaction to proceed (because Rule C is confident that the transaction is not fraudulent). The ultimate predicted result of the rule set 512.1 is determined by the rule with higher priority, which is Rule D in this example. Thus, the past predicted result for transaction Trx 1 as determined by the rule set is "strong approve." The (true) observed outcome for Trx 1 is that it is fraud so the rule set's prediction turns out to be a false negative as indicated by "FN" in the performance column.

Referring to the next row, which corresponds to transaction Trx 2, Rules B and D are not triggered, which is represented by "−1" in their respective cells. Rules A and C are triggered, and the values in their cells represent the rule priority as indicated by rule set 500.1. The action for Rule A is "decline," which does not allow the transaction to proceed (because Rule A predicts that the transaction is fraudulent). The action for Rule C is "alert," which will send the transaction for further review. The ultimate predicted result of the rule set is determined by the rule with higher priority, which is Rule C in this example. Thus, the past predicted result for transaction Trx 2 as determined by the rule set is "review." The (true) observed outcome for Trx 2 is that it is not fraud so the rule set's prediction turns out to be a false positive as indicated by "FP" in the performance column.

Referring to the next row, which corresponds to transaction Trx 3, Rules B and C are not triggered, which is represented by "−1" in their respective cells. Rules A and D are triggered, and the values in their cells represent the rule priority as indicated by rule set 500.1. The action for Rule A is "decline," which does not allow the transaction to proceed. The action for Rule D is "strong approve," which allows the transaction to proceed. The ultimate predicted result of the rule set is determined by the rule with higher priority, which is Rule D in this example. Thus, the past predicted result for transaction Trx 3 as determined by the rule set is "strong approve." The (true) observed outcome for Trx 3 is that it is fraud so the rule set's prediction is a false negative.

Referring to the final row, which corresponds to transaction Trx 4, Rules A and D are not triggered, which is represented by "−1" in their respective cells. Rules B and C are triggered, and the values in their cells represent the rule priority as indicated by rule set 500.1. The action for Rule B is "approve," which allows the transaction to proceed (because Rule predicts that the transaction is not fraudulent). The action for Rule C is "alert," which will send the transaction for further review. The ultimate predicted result of the rule set is determined by the rule with higher priority, which is Rule C in this example. Thus, the past predicted result for transaction Trx 4 as determined by the rule set is "review." The (true) observed outcome for Trx 4 is that it is not fraud so the rule set's prediction is a false positive.

The set of evaluation rules is sometimes referred to as an original rule set or initial rule set, because as further described below, the set of evaluation of rules can be modified and then evaluated to see if the modified rule set performs better or worse than the initial rule set. Typically, at the time of the deployment of fraud detection system (after training with the latest data), a rule set with specified priorities and activations performs well. However, over time, fraud patterns change, and the performance of a given set of rules degrades because it does not detect fraud in the new patterns very well for example due to concept drift. Some rules may remain effective while others may become redundant or begin to perform poorly. For example, rules that initially accurately detect fraud do not perform as well when fraudsters change their strategies. In the example of FIG. 5A, rule set 500.1 may have performed well initially, but it does not perform well for transactions Trx 1-4 because its predictions were all false positives or false negatives. The process may periodically repeat evaluation of a rule set to determine whether it continues to perform well. The process may build variations of a rule set and evaluate whether those sets perform better for incoming transactions as follows.

Returning to FIG. 4, the process determines one or more sets of alternative activations or priorities of at least a portion of the evaluation rules (402). Sometimes, turning off high-priority rules allows lower-priorities rules to act, which can lead to different decisions by the system. The process may modify a rule set such as by changing activations or priorities of individual rules, removing rules, adding rules, or the like to ensure that rule sets continue to meet performance objectives over time. The modifications may incorporate emerging knowledge such as new rules, blacklists, etc. In various embodiments, this step is optional and/or performed if desired by a user to modify the rules pool.

The process may modify an initial pool by cloning existing rules (meaning that the rules will have the same triggers), then assigning different priorities to the cloned rules. Rule sets may be modified systematically or randomly such as by using the optimization process of FIG. 9 or 10. Since a rule set may have many rules and many possible priorities, the search space of all possible rule priorities can be large and computationally expensive to process. One approach for such cases is to determine alternative activations or priorities using random priority shuffle.

The process assesses the one or more sets of alternative activations or priorities based on the specification (404). The process may assess a modified rule set in the same way described above by comparing results (actions) predicted by the modified rule set with observed outcomes. An example of a rule evaluation process is shown in FIG. 8. The performance of the modified rule set may then be compared with other rule sets (such the rule set associated with the specification received at 400) to find a rule set that best meets performance objectives.

Rules may be evaluated individually and/or collectively. The contribution of individual rules to a fraud detection system may change over time and this change may be measured. For example, each rule is independently measured by determining how well its decisions match the labels. For example, accept rules are expected to find legitimate transactions, while alert and decline rules are expected to find fraudulent transactions. In various embodiments, if a rule's performance is inadequate, the rule is discarded (e.g., de-activated or priority is lowered).

Rules may be evaluated collectively to take into account the interactions between rules with different actions and different priorities. For some rule sets evaluating the overall performance of a rule set along with individual rules performance yields a better evaluation result. Sometimes analyzing the performance of the rule independently sometimes does not give a full picture of the entire system, so the process evaluates a rule's dependencies. In one aspect, the rules management system considers how a rule contributes to the entire system as the rule's triggers may overlap with other rules with different decisions and priorities.

Figure 5B:
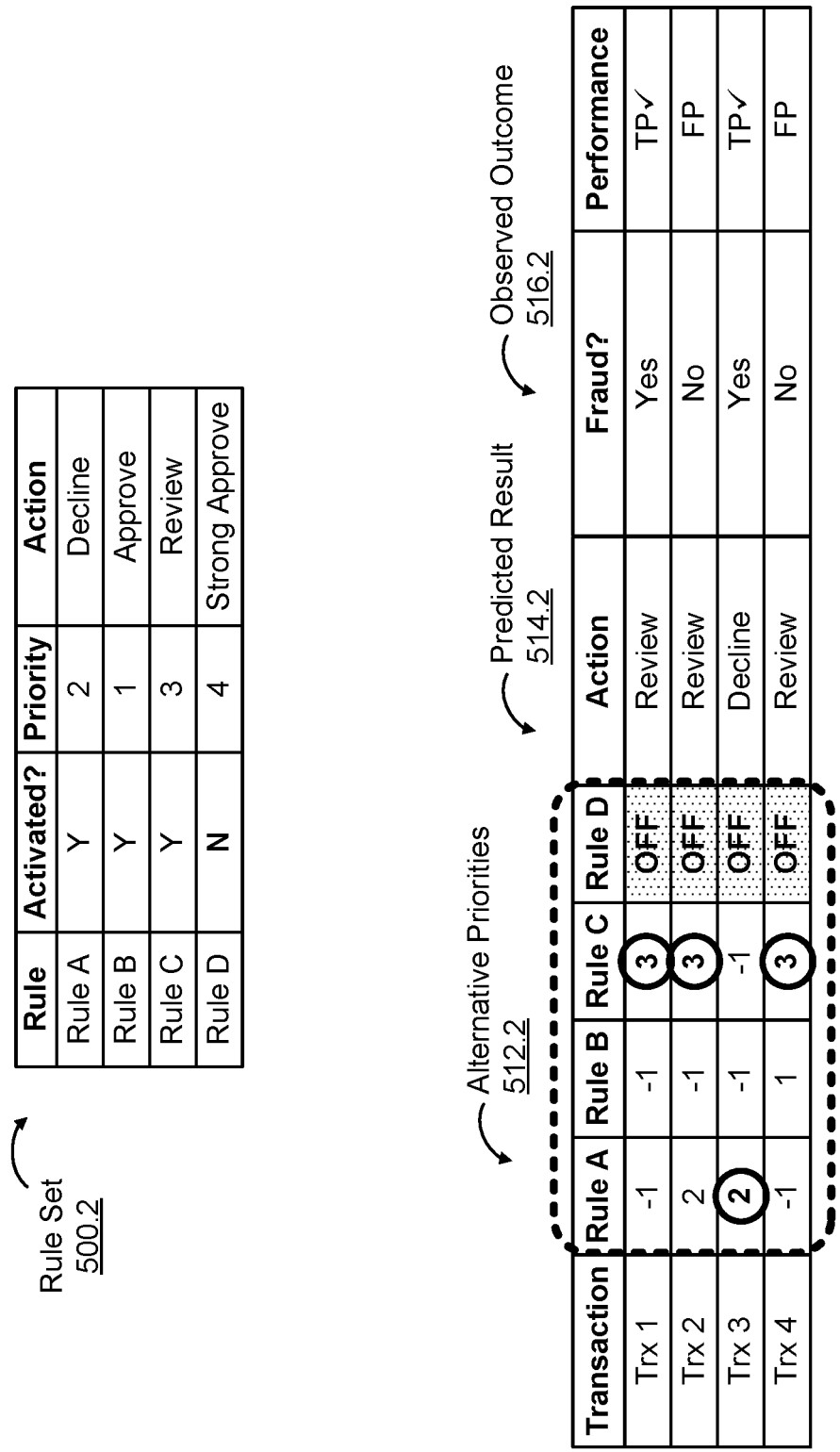
FIG. 5B shows an example of alternative activations.
Figure 6A:
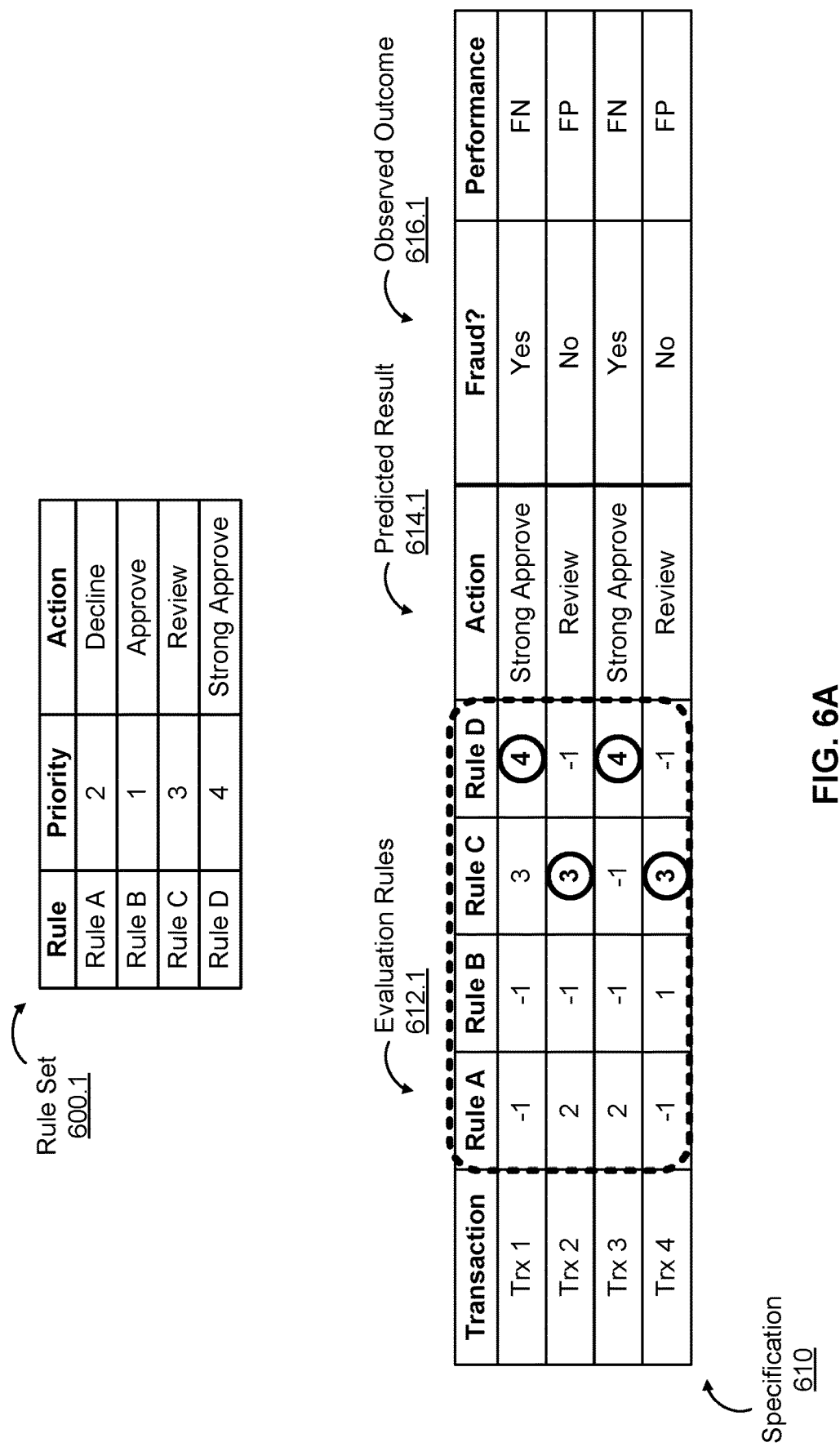
FIG. 6A shows an example of an initial rule set.
Figure 6B:
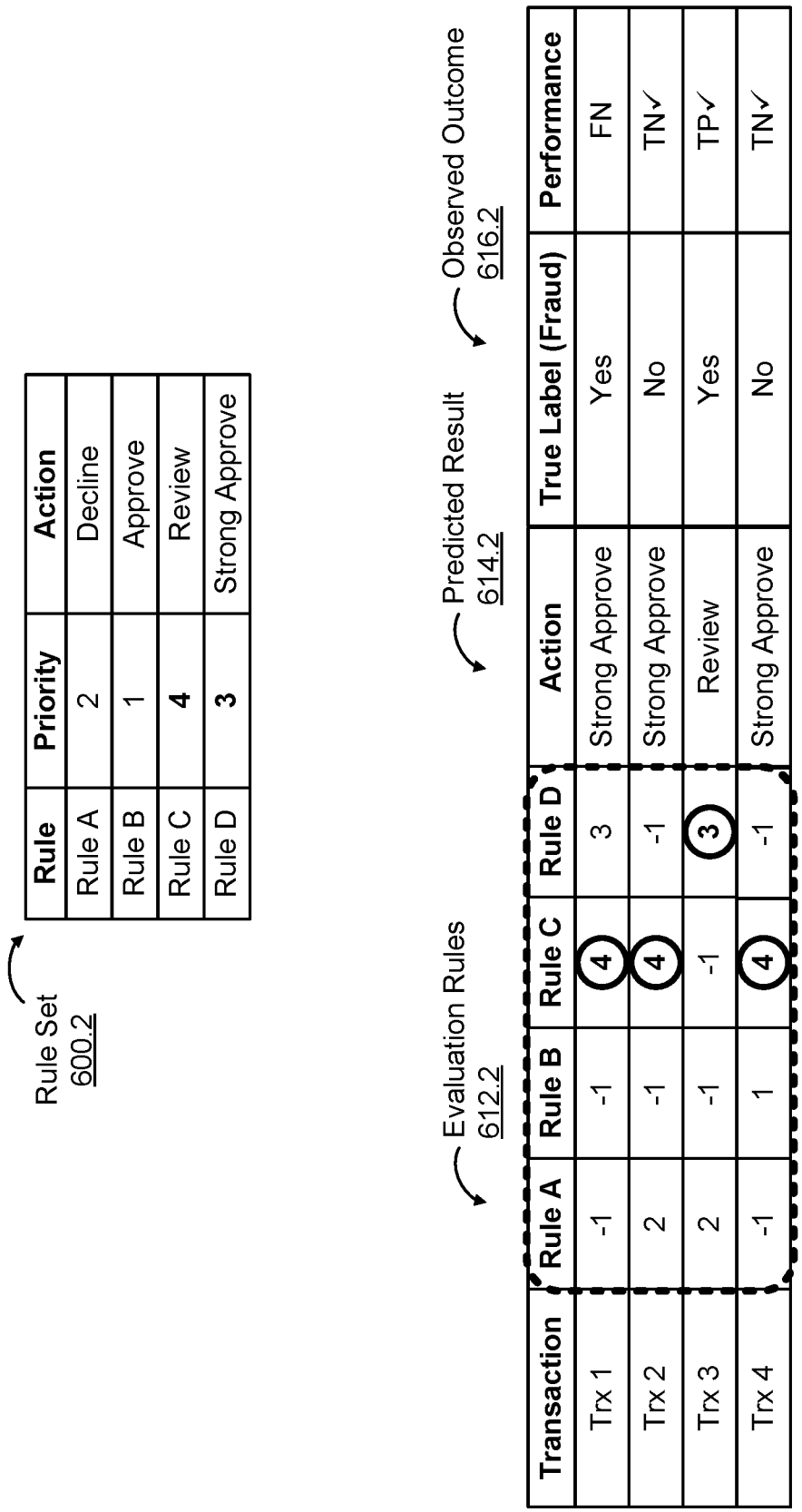
FIG. 6B shows an example of alternative priorities.

FIG. 5B shows an example of alternative activations and FIG. 6B shows an example of alternative priorities (compared with FIG. 6A which shows an example of an initial rule set). For simplicity, activations and priorities are explained separately, but a rule set can have a combination of alternative activations and priorities. Referring to FIG. 5A, rule set 500.1 does not perform well because it resulted in two false negatives and two false positives for specification 510.1. Sometimes changing the rule activations will improve the performance of the rule set by reducing the number of false positives and/or false negatives. FIG. 5B shows an example of a rule set modified by changing the activation of Rule D from "yes" to "no." Deactivating Rule D means that this rule is not applied to any data. This causes rule set 500.2 to perform better than rule set 500.1.

Referring to the row corresponding to transaction Trx 1, Rule D is off, which is presented by "OFF" in its cell. Rules A and B are not triggered, which is represented by "−1" in their respective cells. Rule C is triggered, and the value in its cell represents the rule priority as indicated by rule set 500.2. The action for Rule C is "alert," which will send the transaction for further review. Thus, the past predicted result for transaction Trx 1 as determined by the rule set is "alert." The (true) observed outcome for Trx 1 is that it is fraud so the rule set's prediction is a true positive. Therefore, rule set 500.2 performs better than rule set 500.1 (which yielded a false negative) for transaction Trx 1.

Referring to the row corresponding to transaction Trx 3, Rule D is off, which is presented by "OFF" in its cell. Rules B and C are not triggered, which is represented by "−1" in their respective cells. Rule A is triggered, and the value in its cell represents the rule priority as indicated by rule set 500.2. The action for Rule A is "decline," which does not allow the transaction to proceed. Thus, the past predicted result for transaction Trx 3 as determined by the rule set is "decline." The (true) observed outcome for Trx 3 is that it is fraud so the rule set's prediction is a true positive. Therefore, rule set 500.2 performs better than rule set 500.1 (which yielded a false negative) for transaction Trx 3.

In various embodiments, the process uses the assessment information to optimize a rule-based system (such as fraud detection system 100) by deactivating underperforming rules or changing priorities as follows.

The process optimizes result activations or priorities of the evaluation rules based at least in part on the assessment (406). The process optimizes results activations or priorities of the evaluation rules using those activations or priorities that yield a rule set that meets performance objectives such as a loss function specified by a user. For example, an optimized rule set may balance performance (accuracy) with response speed (processing resources consumed), maximize recall subject to meeting a certain false positive rate, maximize precision, etc. The process may use the set determined at 402 or may repeat 402 one or more times to obtain further modified rule sets. The process may iterate through one or more variations of rule sets to find an optimized result rule set. By way of non-limiting example, the process checks various combinations of rule activations and priorities by random search, greedy expansion, or genetic programming as further described below with reference to FIGS. 9 and 10. If the set(s) of alternative activations or priorities meets one or more optimization parameters, then the set(s) will be considered the "result" activations or priorities to be used by a prediction system to process incoming data.

Figure 7A:
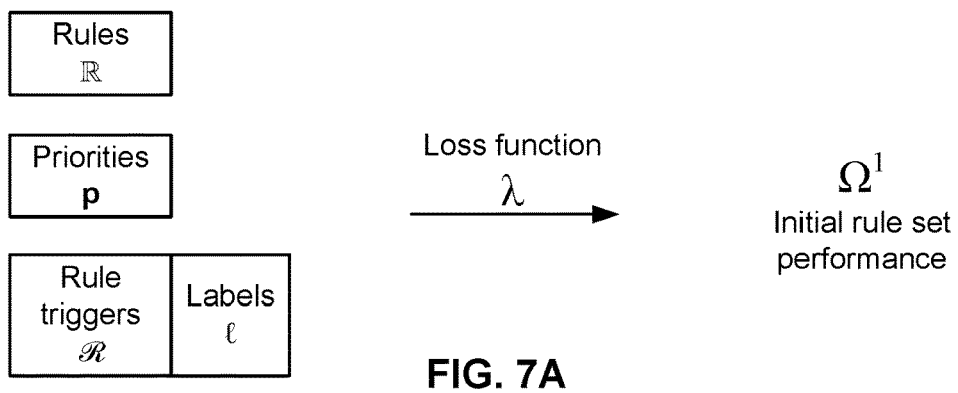
FIG. 7A shows an example of a specification of past predicted results of evaluation rules and the corresponding observed outcomes.
Figure 7B:
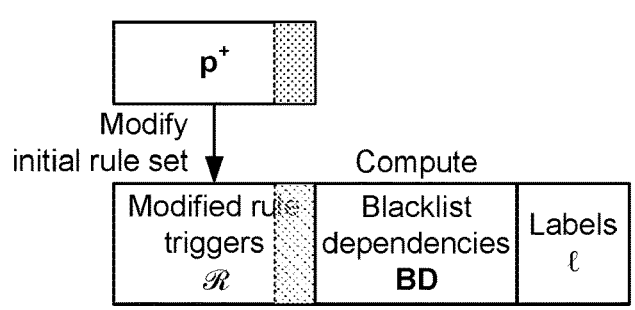
FIG. 7B shows an example of set(s) of alternative activations or priorities of at least a portion of the evaluation rules.
Figure 7C:
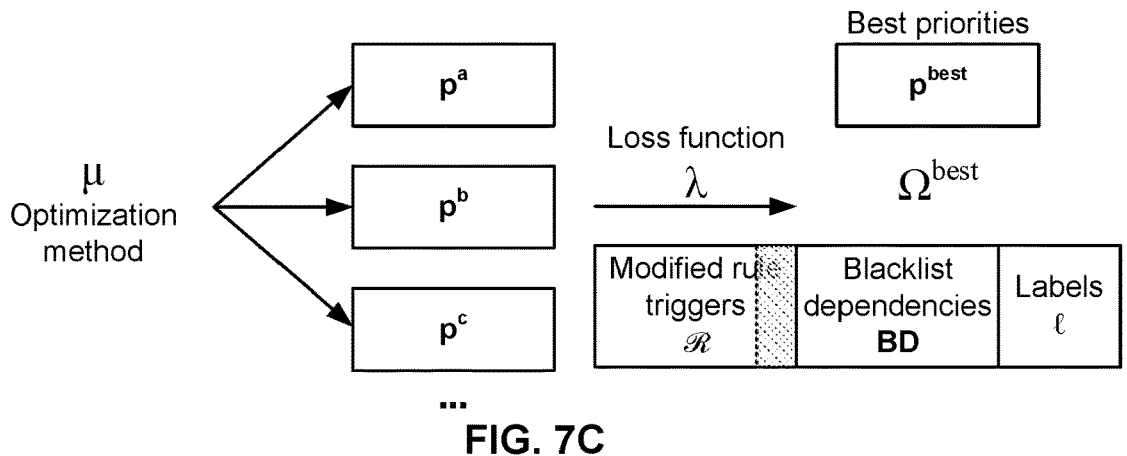
FIG. 7C shows an example of optimizing a rule set according to a loss function.
Figure 7D:
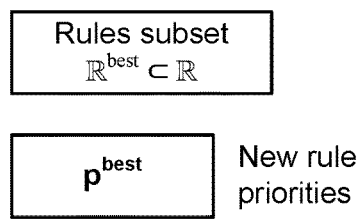
FIG. 7D shows a rule set resulting from the optimization that performs the best out of various alternative activations and priorities as measured by system or user-defined metrics.

FIGS. 7A-7D shows an example of a rule set processed using automated rules management according to an embodiment of the present disclosure. The process of FIG. 4 is applied to evaluate an initial rule set (FIG. 7A), modify the rule set (FIG. 7B), and optimize the rule set (FIG. 7C) to obtain a resulting rule set (FIG. 7D).

In various embodiments, the following terms and notations may be used and refer to the definitions and examples that follow.

Features. A feature is a characteristic, field, or other parameter associated with a transaction. Examples of features include a username or email. In some embodiments, features are stored in a vector, $\chi$.

Transactions. A transaction is a data transmission to be processed using the disclosed rules management techniques. Examples of transactions include a purchase made by credit card or an ATM withdrawal. In some embodiments, transactions are stored in a matrix $X^{n \times m}$ containing values of the m features for each of the n transactions. All or part of a transaction can be used to calculate blacklists. For example, username=fraudset91 is a blacklisted value for a feature.

Labels. The label for a transaction is an observed outcome such as fraudulent or not fraudulent. In some embodiments, labels are stored in a vector, $\ell$ Rule priorities. The priority for a rule indicates the relative importance of that rule within a set of rules. If multiple rules are triggered, then the rule with the highest priority takes precedence, i.e., the final action for the instance is the action of the rule with highest priority. Various scales can be used, e.g., a descending scale of 1-10 where 1 is the highest priority or an ascending scale of 1-10 where 1 is the lowest priority. In some embodiments, priorities are stored in a vector, p.

Rule triggers. Trigger information indicates whether a rule within a rule set was triggered for a certain instance. In some embodiments, triggers are stored in a matrix $R^{n \times k}$ containing the rule triggers of the k rules for each of the n instances (e.g., transactions). The value of each cell in the matrix represents whether the corresponding rule triggered, and if triggered, it contains the rule's priority. For example, each cell $R_{ij}=-1$ if rule $R_j$ did not trigger for transaction $x_i$ or $R_{ij}=p_j$ (i.e., the rule's priority) if the rule did trigger.

Priority shuffle. A boolean (e.g., augment rules pool or "arp") specifying whether the rules management system augments a rules activation matrix (R) by cloning rules with different priorities.

Actions. A map, a, mapping rule priority to actions such as accept, alert or decline.

Optimization process. An optimization strategy, $\mu$, such as genetic programming, greedy expansion, or random search further described below with respect to FIG. 9.

Optimization parameters. A set of parameters, $\theta$, which are specific to an optimization strategy (e.g., population size or mutation probability for a genetic programming algorithm or a number of evaluations for a random search).

Loss function. A loss function, $\lambda$, which may be defined by a user.

Blacklisting rules. A set of blacklisting rules containing rules that update a blacklist ($\mathcal{B}^u$) and check the blacklist ($\mathcal{B}^c$).

The above elements are summarized in Table 1. Some examples described herein use various vectors and matrices. These are merely exemplary and not intended to be limiting as other data structures may be used.

TABLE 1

| Element | Notation |
|---|---|
| Features | $X = (X_1, X_2, \ldots, X_m)$ |
| Transactions | $X = (x_1, x_2, \ldots, x_n)$ |
| Transaction features vector | $x = (x_1, x_2, \ldots, x_m)$ |
| Transaction rules vector | $r = (\{p_1, -1\}, \{p_2, -1\}, \ldots, \{p_k, -1\})$ |
| Labels vector | $\ell [l_{x1}, l_{x2}, \ldots, l_{xn}]^T$ |
| Rules | $\mathbb{R} = (R_1, R_2, \ldots, R_k)$ |
| Priority space | $\mathbb{P} = \{p \in \mathbb{Z} \mid p \geq -1\}$ |
| Rule active condition | $p > -1$ |
| Rule priority | $p_i \in \mathbb{P}$ |
| Rules priority vector | $p = (p_1, p_2, \ldots, p_k)$ |
| Priority-action map | $a: p_i \rightarrow \{accept, alert, decline\}$ |
| Rules trigger matrix | $R = [r_{x1}, r_{x2}, \ldots, r_{xn}]^T$ |
| Loss function | $\lambda$ |
| Blacklist updater rules | $\mathcal{B}^u \subset \mathbb{R}$ |
| Blacklist checker rules | $\mathcal{B}^c \subset \mathbb{R}$ |
| Performance | $\Omega$ (e.g., $\Omega_{loss}$, $\Omega_{recall}$, etc.) |
| Optimization strategy | $\mu$ |
| Optimization parameter | $\theta$ |

FIG. 7A shows an example of a specification of past predicted results of evaluation rules ($\mathbb{R}$) and the corresponding observed outcomes (labels $\ell$). The predicted results of the rules may be evaluated with respect to one or more parameters or functions such as a loss function ($\lambda$) to obtain the performance of the rule set ($\Omega^1$). The rules ($\mathbb{R}$), priorities of rules within the rule set (p), rule triggers (R), observed outcomes ($\ell$), and/or the performance of the initial rule set ($\Omega^1$) may be included in the specification received at 400 of FIG. 4. In various embodiments, the rule set performance is received while in other embodiments the process determines the performance of the rules.

FIG. 7B shows an example of set(s) of alternative activations (R) or priorities (p+) of at least a portion of the evaluation rules. Step 402 of the process of FIG. 4 can be applied to rule set ($\mathbb{R}$) from FIG. 7A and/or other obtained information to determine the set(s) of alternative activations or priorities of at least a portion of the evaluation rules.

Various strategies such as priority shuffle can be used to augment, alter activations or priorities, or otherwise change the initial rule set ($\mathbb{R}$). In this example, additional priorities are added so that p+ is larger than original priorities p as indicated by the shaded portion showing the size of p compared with p+. For example, starting from the existing priorities, p, variants are created for each $p_i \in p$, with all possible alternative priorities with the same action, E. Then, for each $p_j \in E$, a new vector (a new "rule") with the same triggers/activations as the original rule and the new priority, $p_j$, is added to the rules activation matrix, R.

For a given rule $R_i$ with priority $p_i$, the process changes its priority to $p_j \neq p_i$ with the same action, i.e., $a_i = a_j =$, e.g., both are accept rules with the same semantics/syntax (and thus they trigger for the same instances), but they have different priorities. The new rule priority is sampled considering uniform probabilities or user-specifiable sampling probabilities. Consider the illustrative example with three types of accept rules: rule $R_1$ is weak accept with priority 1, rule $R_2$ is strong accept with priority 3, and rule $R_3$ is whitelist accept with priority 5. Random priority shuffle can, for example, change the priority of rule $R_2$ to either 1 (swapping the priority with rule $R_1$) or 5 (swapping the priority with rule $R_3$). In various embodiments, the alternative activations or priorities take into account blacklist dependencies (BD) for example by performing the process of FIG. 11 to compute blacklist dependencies.

FIG. 7C shows an example of optimizing a rule set according to a loss function. Step 404 of the process of FIG. 4 can be applied using an optimization method ($\mu$) that, starting from the original priorities p, generates different priorities sets $p^a$, $p^b$, $p^c$, and so on. These alternative priorities may be assessed (e.g., by performing the process of FIG. 8) with respect to the loss function ($\lambda$) to determine corresponding performance ($\Omega^a$ for $p^a$, $\Omega^b$ for $p^b$, and $\Omega^c$ for $p^c$). The priorities that perform best from among those assessed are represented by $p^{best}$, having performance $\Omega^{best}$ in FIG. 7B.

FIG. 7D shows a rule set ($\mathbb{R}^{best}$) resulting from the optimization that performs the best out of various alternative activations and priorities as measured by system or user-defined metrics such as a user-defined loss function, recall, false positive rate (FPR), etc. In this example, the optimized rule set ($\mathbb{R}^{best}$) is a subset of the initial rule set ($\mathbb{R}$) and has result priorities $p^{best}$ Optimized rule set ($\mathbb{R}^{best}$) may be obtained by applying the process of FIG. 4 to activate/de-$\mathbb{R}$ activate rules or change rule priorities to obtain a new priority vector ($p^{best}$) to reduce the loss of the system ($\Omega^{best}$).

Next, an example of rule evaluation will be described in greater detail.

FIG. 8 is a flow chart illustrating an embodiment of a process for rule evaluation. The process may be performed by a processor such as evaluator 310 or processor 1302. The process may be performed as part of another process such as the process of FIG. 4. The rule evaluation process may be performed to evaluate one or more rules such as an initial set of rules (e.g., the evaluation rules received at 400) or a modified set of rules (e.g., a set of alternative activations or priorities at 404). The process evaluates a rule set, which may be based on a specification of predicted results of evaluation rules and corresponding observed outcomes such as that received at 400 of FIG. 4 or may be based on alternative actions of priorities of at least a portion of the evaluation rules such as that determined at 402 of FIG. 4. In various embodiments, the process obtains (receives or determines) additional information such as one of or more of the following: features, transactions, rules activations or priorities, observed outcomes (labels), blacklist updater/checker rules and dependencies, or loss function.

In various embodiments, the process keeps track of rule evaluations using a confusion matrix V. The process creates an empty confusion matrix, V, which is updated by traversing each transaction, x∈X, alongside its rule triggers, $r_i$∈R, and its label, $\ell_i$∈$\ell$.

For each transaction, the process begins by calculating rule triggers (800). The process calculates triggers $r'_i$ (representing what rules triggered and with which priority for that transaction) using priority vector p and the original rule triggers matrix R. This process, after running for all transactions, generates rule triggers R'. Since some rules might have been deactivated or had their priorities changed by the rules management system, R' may be different from R. Referring to FIG. 5B, the process calculates that Rule C is triggered and the other rules are not triggered.

The process obtains a decision about a transaction (802). In various embodiments, using those rules that are triggered, the process obtains a decision for each transaction (rule action), $a_i$, e.g., to accept, alert, or decline. As further described below, in some embodiments, the triggers can be further processed such as by applying a blacklist handler to obtain ($r''_i$) prior to obtaining the decision/action.

Suppose a transaction $x_i$ involves using credit card "123" to buy 2 bananas at location Anytown, USA. Suppose the rule set includes: $r_1$=Rule A, which declines a transaction if a card (associated with/used for the transaction) has never been used within 100 miles of the current transaction location; $r_2$=Rule B, which allows a transaction if the mailing address associated with the transaction has been used by the card before; and $r_3$=Rule C, which alerts a transaction (sending it for further review) if the card is being used for the first time in more than 30 days and a transaction location more than 100 miles away from a previous transaction.

The process evaluates the decision to determine whether the decision is a true negative, a true positive, a false negative, or a false positive (804). The process compares the transaction decision ($a_i$) with an observed outcome ($\ell_i$) and stores the evaluation result in vi of confusion matrix V. Accepting a legitimate transaction is a true negative, while declining/alerting a legitimate transaction is a false positive. Declining/alerting a fraudulent transaction is a true positive, while accepting a fraudulent transaction is a false negative.

Suppose transaction $x_i$ turns out to be fraudulent. Then the observed outcome label $\ell_i$=1. Rule A, which declined the transaction, would be a true positive; Rule B, which allowed the transaction, would be false negative; Rule C, which alerted the transaction, would be a true positive.

The process calculates an overall rule configuration performance based on a user-defined loss function (806). The process uses the confusion matrix V to compute the rule configuration's performance, $\Omega$, based on a parameter such as a user-defined loss function, $\lambda$. The loss function can define various aspects of performance such as FPR, recall, number/ratio of activated rules, relative performance to some reference rule set, number/ratio of alerted transactions, etc. The loss function permits optimizations (such as minimizing the number of active rules or maximizing recall) subject to certain constraints (such as meeting a particular FPR, keeping an original system's FPR, or no constraints at all).

For example, an online merchant may be required by law to keep the fraud-to-gross rate (FTG) under a certain threshold. This can be captured by a loss function that minimizes the FPR and ensures that recall is within the legal requirements. As another example, a loss function can specify a number of rules or alerts to decrease the computational cost of the rules management system and correspondingly the prediction (e.g., fraud detection) system.

An example of a loss function is:

$$\lambda(R') = \alpha\Omega'_{rules\,\%} - \beta\Omega'_{recall\%} + \gamma\Omega'_{alerts\,\%} \quad (1)$$

where $\Omega'$ is the performance of a rules configuration found by the disclosed techniques, $\Omega'_{rules\,\%}$ is the percentage of active rules, $\Omega'_{recall\,\%}$ is the recall, and $\Omega'_{alerts\,\%}$ is the alert rate. $\alpha$, $\beta$, and $\gamma$ are selectable values that accord a desired weight to the objectives (percentage of active rules, the recall, or the alert rate). Example values are $\alpha$=0.1, $\beta$=0.5, and $\gamma$=0.4.

Loss functions can also be constrained such as:

$$\lambda(R') = \begin{cases} \alpha\Omega'_{rules\%} + \beta\Omega'_{alert\%}, & \text{if } \Omega'_{recall} \geq 0.95 * \Omega^1_{recall} \\ \alpha + \beta + (\Omega^1_{recall} - \Omega'_{recall}), & \text{otherwise} \end{cases} \quad (2)$$

where $\Omega$ is the performance of an initial rules configuration, and the other parameters are like those discussed for loss function Equation (1). Constraints might be hard constraints (as above) or soft constraints. This type of loss function may find application in a fraud detection system that has an intentionally high FPR. Selecting $\alpha=\beta=0.5$ would give equal importance to both objectives of (i) removing rules $\Omega'_{rules\,\%}$ and reducing alerts $\Omega'_{alert\,\%}$ while (ii) maintaining approximately the same recall $\Omega'_{recall}$ as the initial rules configuration Q recall.

As yet another example of a loss function:

$$\lambda(R') = \begin{cases} \alpha\Omega'_{rules\%} + \beta\Omega'_{recall\%}, & \text{if } \Omega'_{fpr} \leq \Omega^1_{fpr} \\ \alpha + (\Omega^1_{fpr} - \Omega'_{fpr}), & \text{otherwise} \end{cases} \quad (3)$$

where $\Omega_{fpr}$ is the false positive rate, and the other parameters are like those discussed for loss function Equations (1) and (2). This type of loss function may find application in a fraud detection system whose objectives are to reduce rules $\Omega'_{rules\,\%}$, improve recall $\Omega'_{recall}$, and maintain approximately the same FPR $\Omega'_{fpr}$ as the initial rules configuration. Selecting $\alpha=0.05$ and $\beta=0.95$ would give more importance to improving recall than reducing the number of rules.

In various embodiments, rules evaluation takes into consideration blacklist dependencies. Blacklisting rules, when triggered due to fraudulent behavior, blacklists the user (or email, or card, etc.) so that their future transactions are promptly declined. Deactivating blacklisting rules has side effects on the blacklists themselves and, therefore, in triggering or not triggering rules that verify them. The process can handle blacklist dependencies by checking whether to turn off any blacklist checker rules as a side-effect after 800 and before 804, and stores that in r"$_i$. For example, transaction rules vector r"$_i$ stores a set of rules with blacklist checker rules deactivated. An example of determining blacklist dependences is shown in FIG. 11.

FIG. 9 is a flow chart illustrating an embodiment of a process for optimizing a rule set. The process may be performed by a processor such as optimizer 320 or processor 1302. The process may be performed as part of another process such as at 406 of FIG. 4.

The process begins by receiving a set of rule priorities (900). The set of rule priorities corresponds to a set of rules. In various embodiments, the received set of rule priorities corresponds to the specification of evaluation rules received at 400 or a set of alternative activations or priorities of at least a portion of the evaluation rules determined at 402. The set of rule priorities may be stored in a data structure such as a rules priority vector (p).

The process may obtain (receive or determine) additional information such as one of or more of the following: transactions (X), a rules activation matrix (R), observed outcomes ($\ell$), priority-action map (a), blacklist dependencies (BD), loss function ($\lambda$), performance ($\Omega^1$), or optimization parameters ($\theta$). Some of this additional information may be used to evaluate the performance of the rule priorities generated using the received rule priorities as further described below.

In various embodiments, a goal of the process is to determine a set of rule priorities ($p^{best}$) that performs better ($\Omega^{best}$) than an initial rule set having the received rule priorities p and performance $\Omega^1$. That is, according to the performance metric (e.g., a loss function) $\Omega^{best}$ is better than $\Omega^1$ and thus $p^{best}$ is better than the original p.

The process generates a set of rule priorities different from the received rule priorities (902). The process generates new priority vectors (p') which are variations of the received rule priorities (p). Priority vectors may be generated by random search, greedy expansion, genetic programming, or other search heuristics, or conventional techniques.

One approach is to generate random rules priority vectors, p', and evaluate them against the original p, saving the best rule configuration p' that it found. This approach can be better and less expensive than grid or manual searches. In various embodiments, random search generates rule priorities taking into account rule shutoff probability ($\rho$) and rule priority shuffle probability ($\gamma$). The rule shutoff probability defines the percentage of rules to deactivate. For example, if $\rho=50\%$, then the process turns off around 50% of the rules. Rule priority shuffle probability defines the percentage of rules with priorities changed. For example, if $\gamma=50\%$, then the process generates new priority vectors for around 50% of the rules. An example of a rule shutoff probability that performs well is $\rho=40\%$.

Another approach is to generate rules priority vectors (p') using greedy expansion. The process starts from a set of inactive rules and greedily turns on rules, one at the time. In some embodiments, most rules start inactive (turned off) except for a few rules. The rules that start active may be those that are not turned off for business reasons (e.g., due to user/client specifications) or they are known to perform well. Consider the following example, where the optimization parameter is recall and rules R1, R2, and R3 have recall 70%, 69%, and 20%, respectively. A greedy solution would pick R1 first. Now, imagine that rules R2 and R3 are detrimental to R1, i.e., the system becomes worse if R1 is combined with either R2 or R3. Hence, the final solution is a system with only R1. Imagine, however, that R2 and R3 are somewhat complementary, and that, when combined, the system's recall is >70%. Then, the global optimum is >70%, and while the greedy solution is not optimal, greedy heuristics can find useful solutions in a reasonable time.

Yet another approach is genetic programming, which continuously improves a population of priority vectors by combining them using crossovers and random mutations, while keeping a fraction of the best solutions for the next iteration. An example of genetic programming optimization is shown in FIG. 10.

The process compares the set of generated rule priorities to a previous set of rule priorities (904). The previous set of rule priorities may be the initial set of rule priorities received at 900 or, if multiple iterations of the process are performed, may be some intermediate previous rule set. The process may evaluate the performance of a rule set having the generated rule priorities against the performance of a rule set having the previous set of rule priorities using an evaluation process such as the one in FIG. 8.

The process determines whether the generated rule priorities performs better than the previous set of rule priorities (906). In various embodiments, the process stores/outputs the variation with lowest loss it finds, $p^{best}$, alongside its performance, $\Omega^{best}$. If the generated rule priorities do not perform better than the previous set of rule priorities, the process returns to 902 to generate further rule priorities. Otherwise, if the generated rule priorities perform better than the previous set of rule priorities, the process proceeds to check whether a stopping condition is met (908).

If the stopping condition is not met, the process returns to 902 to generate further rule priorities. Otherwise, if the stopping condition is met, the process ends. In some embodiments, at 906, even if the generated rule priorities do not perform better than a previous set of rule priorities, the process ends. By way of non-limiting example, a stopping condition may include one or more of the following: elapse of time (e.g., k hours), generating a pre-defined number of rule priorities (e.g., n variations on a set of rule priorities), loss between consecutive iterations does not improve above a threshold.

FIG. 10 is a flow chart illustrating an embodiment of a process for optimizing a rule set using genetic programming. The process may be performed by a processor such as optimizer 320 or processor 1302. The process may be performed as part of another process such as at 406 of FIG. 4. The process improves an initial population based on one or more of the following parameters: population size ($\psi$), survivors fraction ($\alpha$), or mutation probability ($\rho$). A population of rule configuration is improved when it performs better than an initial population of rule configurations. The values of the parameters are selectable and example values that perform well are: $\psi$=30, $\alpha$=5%, and/or $\rho$=10%.

The process begins by receiving a set of rule priorities (1000). The set of rule priorities corresponds to a set of rules. In various embodiments, the received set of rule priorities corresponds to the specification of evaluation rules received at 400 or a set of alternative activations or priorities of least a portion of the evaluation rules determined at 402. The set of rule priorities may be stored in a data structure such as a rules priority vector (p).

The process generates an initial population of rule configurations based at least in part on the received set of rule priorities (1002). The rule configurations refer to a set of rules with associated activations and priorities. In various embodiments, the initial population includes randomized rule configurations. The process generates the initial population based on population size ($\omega$) and/or mutation probability ($\rho$). The population size ($\psi$) defines the number of configurations per iteration. For example, if $\psi$=100, the process generates 100 different rule configurations per iteration. The mutation probability refers to how many rules are turned off and/or had their priorities changed. For example, if $\rho$=20%, the process changes the priority and/or de-activates 20% of the original rule and/or rule priorities. If so desired, p can be different for rule-deactivations and rule priority changes.

The process updates the population by evaluating a previous population and selecting survivors (1004). In a first iteration, the previous population is the initial population generated at 1002. The process evaluates the previous population to determine how well the population of rule configurations performs to make predictions on data. For example, the process of FIG. 8 can be performed on the population to determine the performance of the population. The process selects survivors from the rule configurations that performed best.

The survivors fraction ($\alpha$) defines a fraction of the top configurations that survive for the next iteration. For example, if $\omega$=100 and $\alpha$=20%, the 20 best rule configurations survive for the next iteration. $\alpha$ is tunable to balance variability and efficiently finding a good solution. If $\alpha$ is high, then the process might achieve higher variability but get stuck trying to improve bad solutions. If $\alpha$ is low, then the lack of variability might prevent the system from reaching a good solution.

The process updates the population by performing mutations and/or crossovers (1006). The process generates new child rule configurations by mutating and/or crossing over existing parent rule configurations. By mutating and/or crossing over rule configurations, the process may form rule configurations that perform better than previous rule configurations.

The mutation probability ($\rho$) defines the percentage of rules subject to random mutation. For example, if $\rho$=20%, then 20% of the rules are randomly mutated meaning the child rule configuration mutates the parents rules configuration, i.e., changes their priorities and de-activations. The higher the p value, the more random is the search. By lowering the p value, a good solution becomes more dependent on finding good parent configurations.

In various embodiments, the process performs a mutation and/or crossover by selecting two random survivors from the past iteration, and one is the "mother" and the other is the "father". The process then generates children rule configurations, where each child (new) configuration has around 50% of the configuration of the father and around 50% of the configuration of the mother. Each "mother" and "father" is picked independently for each new configuration. To add randomness and try to mitigate being stuck in local optimum values, in various embodiments the process adds a percentage of random configurations, similar to what random search does. For example, if $\rho$=20%, then random priority shuffle generates 20% of the rule configurations used in the current iteration of genetic programming, which mutates the affected children by assigning random priorities and/or activations to them. The percentages in this example are merely exemplary and not intended to be limiting.

The process determines whether a stopping condition is met (1008). By way of non-limiting example, a stopping condition may include one or more of the following: elapse of time (e.g., k hours), generating a pre-defined number of rule configurations (e.g., n variations on a population of rule configurations), performance between consecutive iterations does not improve above a threshold, a number of runs/iterations, etc. The stopping condition can be strategically selected. For example, in various embodiments, the number of runs/iterations influences loss more than the population size so a relatively high number of runs (e.g., r=100) may be selected in combination with a relatively low population size (e.g., $\psi$=10). If the stopping condition is met, the process ends. Otherwise, the process returns to 1004 to begin another iteration by updating the population.

The following is an example process for genetic programming optimization that uses the notation of Table 1:

```
θ:  { Population size Ψ , survivors fraction α, mutation probability ρ }
1:  function GENETIC.OPTIMIZE(X, R, l, p, a, BD, λ, Ω¹, θ)
2:      p^best ← p
3:      Ω^best ← Ω¹
4:      P ← GENERATEINITIALPOPULATION(R, p, Ψ, ρ)
5:      while STOPPINGCRITERIANOTMET( ) do
6:          (P⁻, P⁻) ←EVALUATEPOPULATION(P, α)
7:          P⁺ ←MUTATEANDCROSSOVER(P⁻, α, Ψ, ρ)
8:          P ← {P⁻, P⁺}
9:          (P⁻, P⁻) ←EVALUATEPOPULATION(P)
10:         p^best ← P=1
11:         Ω^best ←EVALUATE(X, R, l, pbest, a, B, BD, λ)
12:     return (p^best, Ω^best)
13: function GENERATEINITIALPOPULATION(R, p, Ψ, ρ)
14:     P ← ∅
15:     for i ∈ [0, Ψ[ do
16:         p' ← p
17:         for all p'_j ∈ p' do
18:             with ρ% probability, do:
19:                 p'_j ← −1
20:         P[i] ← p'
21:     return P
22: function MUTATEANDCROSSOVER(P⁻, α, Ψ, ρ)
23:     P+ ← ∅
24:     for i ∈ [0, (1 − α) * Ψ[ do
25:         p^mother ←GETRANDONVECTOR(P⁻)
26:         p^father ←GETRANDOMVECTOR(P⁻)
```

-continued

```
27:         p^child ← p^mother
28:         for all p_j^child ∈ p^child do
29:             with 50% probability, do:
30:                 p_j^child ← p_j^father
31:             for all p_j^child ∈ p^child do
32:                 with ρ% probability, do:
33:                     p_j^child ← RANDOMPRIORITYSHUFFLE(p_i, a)
34:         P⁺.ADD(p^child)
35:     return P⁺
```

FIG. 11 is a flow chart illustrating an embodiment of a process for determining rule dependencies. The process may be performed by a processor such as evaluator 310 or processor 1302. In various embodiments, rules management system 200 includes a rules dependencies manager (not shown) in which case the process may be performed by the manager. The process may be performed as part of another process such as the process of FIG. 4. The rule dependencies determination process may be performed to evaluate rules such as an initial set of rules (e.g., the evaluation rules received at 400) or a modified set of rules (e.g., a set of alternative activations or priorities at 404).

The example that follows is described for a special category of rules called blacklist rules but these are merely exemplary and not intended to be limiting as this process may be applied to any type of rule that may depend on other rules.

Security analysts (who provide observed outcomes such as by generating labels) and/or rules can blacklist entities. For example, if an analyst finds transaction x to be fraudulent, they can blacklist some of its associated entities (e.g., in the future, always decline transactions from the email used in transaction x). Similarly, blacklist updater rules can add entities to the blacklist when they trigger. Other rules, called blacklist checker rules, trigger when a transaction contains a blacklisted entity.

Therefore, blacklist rules may have side effects. Deactivating blacklist updater rules can lead to blacklist checker rules not triggering, and affect a rule set's performance. Thus, blacklists are taken into account when evaluating a rule set. In various embodiments, the rules management system does this by keeping a state of the blacklists and managing them according to interactions between blacklist updater and blacklist checker rules by keeping track of blacklist dependencies.

The process begins by receiving a specification of past predicted results of evaluation rules and corresponding observed outcomes (1100). An example of this is 400 of FIG. 4. In various embodiments, the process obtains (receives or determines) additional information such as one of or more of the following: features, transactions, rules activations or priorities, blacklist updater/checker rules and dependencies.

The process determines dependencies between at least a portion of the evaluation rules (1102). As described above, rules that interact with a blacklist may fall into two categories: blacklist updater rules that add or remove items from a blacklist and blacklist checker rules that check blacklists. An example of a blacklist checker rule is Rule A, which checks whether a user is on a blacklist, and declines a transaction if a blacklisted user is attempting to make the transaction. That is, the trigger for Rule A is a user associated with a transaction being on a blacklist, and the action taken is to decline the transaction. An example of a blacklist updater rule is Rule E, which adds a user to a blacklist if a user has attempted to use a zipcode a threshold number of times (e.g., three times).

Suppose in a first transaction, a user, User1, enters an unsuccessful zipcode three times (or it is the third time that the user has unsuccessfully entered a zipcode). Rule E gets triggered (because the user has attempted to use the zipcode more than three times), and adds User1 to a blacklist of users. On the next transaction made by User1, Rule A gets triggered (because User1 is on the black list), so it declines the transaction. In this example, malicious users are identified and blacklisted to prevent fraud.

Rule A and Rule E are dependent on each other because Rule E (the blacklist adding rule) causes a user to be added to a black list so that when Rule A (the blacklist checking rule) is triggered, an action with respect to the user is taken. When evaluating the performance of Rule A, some of the credit/blame should be given to Rule E as well. For example, Rule E should be penalized if it blacklists a user that is later used in a legitimate transaction. Conversely, Rule E should be given credit if it blacklists a user that is later used in a fraudulent transaction. If blacklist dependencies are not checked, then Rule A alone would be assessed and none of the attribution would be given to Rule E.

The determined dependencies may be taken into account when evaluating the rule set. The scoring for Rule A with respect to a transaction (whether it was a false positive/negative or true positive-negative) would also be used to score Rule E. Rule E may have the same score/categorization as Rule A or may otherwise be assigned a score/categorization that reflects its contribution to the performance of Rule A. Referring to FIG. 5B, suppose Rule A (a blacklist checker rule) depends on Rule E (a blacklist updater rule) and Rule A gets triggered from transaction Trx3 as shown. Then, an evaluation that takes dependencies into consideration would also consider Rule E to have been triggered so that its performance for Trx 3 would be a true positive (the same as the performance of Rule A).

The process optimizes the evaluation rules based at least in part on the determined dependencies between at least the portion of the evaluation rules (1104). The process may determine variations of rule sets that take into account the rule dependencies. In a process that does not take into account dependencies, some rules such as blacklist updater rules never get the blame or credit for processing transactions and so may get eliminated too early (because they were incorrectly assessed as underperforming) or too late (because they were incorrectly assessed as overperforming) in an optimization process. By taking dependencies into consideration, such rules would be appropriately assessed. Optimization techniques include random search, greedy expansion, and genetic programming as further described herein. An example of optimization is 406 of FIG. 4 and the process of FIGS. 9 and 10.

FIG. 12 is a block diagram illustrating an embodiment of a system in which automated rules management can be implemented. The system includes one or more nodes in a cluster 1240 that perform automated rules management. The environment includes one or more transaction devices 1202, 1204, 1206, gateway 1210, network 1220, issuer 1230, and a cluster 1240 made up of one or more nodes 1242.1, 1242.2. Transaction devices 1202-1206 collect transaction data, and transmit the transaction data via gateway 1210 to issuer 1230. Issuer 1230 verifies the transaction data to determine whether to approve the transaction. For example, processing a transaction involving a purchase includes receiving account information (e.g., credit/debit) and transaction details (e.g., purchase amount) at a transaction device and determining whether to approve the transaction. An approved transaction may mean that payment by the account is accepted in exchange for goods or services. A denied transaction may mean that payment by the account is denied.

In some embodiments, whether to approve or deny a transaction can be based on an assessment of the likelihood that the transaction is fraudulent by monitoring data streams using the techniques disclosed herein. In some embodiments, cluster 1240 is configured to perform the techniques disclosed herein to detect anomalies and provide an indication (such as an alarm report) to issuer 1230 or a third party such as a merchant.

By way of non-limiting example, transaction data may include one or more of: time of transaction, account/payment information (such as a credit card account number, a debit account number, or a bank account wire number), amount paid, currency, transaction location, merchant name, merchant address, category code, city, state, zip, country, terminal identification, authentication type, and the like. In some embodiments, account data is generated by the transaction device by processing/filtering the account information. For example, an account number can be encrypted/hashed to protect the account number. A transaction device may be implemented by a terminal, a point of sale (POS) device, or any other device that accepts account information. For example, a terminal includes a credit card terminal that processes payment based on a received credit card account number. The transaction device may receive and parse account information using a variety of electronic techniques such as a chip reader, a magnetic stripe reader, barcode scanner, etc. In some embodiments, a transaction device is associated with a location and may be identified by its associated location. For example, a brick and mortar retailer (BM) having three checkout terminals (12-3) each equipped with one of the transaction devices 1202-1206 may be identified by transaction devices BM12, BM2, and BM3. As another example, a transaction device is a website processing payment for goods and services purchased over the Internet.

A transaction location, which is typically associated with a transaction device, is a location where account information can be received to initiate a transaction. A transaction location may be a physical/geographical location, a location of a terminal, a Web location, and the like. Examples of transaction locations include checkout terminals, stores, a group of stores, or a system-wide (e.g., entire E-commerce merchant) location, and the like.

Misappropriated information (e.g., payment information) may be presented to a transaction device 1202-1206 for a purchase. If misappropriated information is used, then the transaction is fraudulent. During a transaction approval process or shortly after the transaction takes place, rules that are managed using the disclosed techniques can be applied on the transaction to determine an action to take with respect to the transaction such as signaling that a transaction is potentially fraudulent. If applied during the transaction, a potentially fraudulent transaction may be prevented by declining the proffered payment method. If applied shortly after the transaction, the transaction may be reviewed and dis-approved or the payment method may be declined for subsequent transactions. This avoids future exploits of the payment method.

A transaction identified to be a potentially fraudulent transaction can trigger remedial action such as verifying with an issuer bank or with the card holder whether the card was used without authorization. If so, then the potentially fraudulent transaction is confirmed to be actually fraudulent. The determination of potentially fraudulent transactions may be used to block a payment type associated with the potentially fraudulent transaction from being used in the future. An anticipated transaction (e.g., future location or time) can be determined/predicted, and preempted by declining the payment type.

Gateway 1210 receives transaction data from one or more transaction devices 1202-1206, routes the transaction data to network 1220, and returns an approval or decline notice based on the approval process of network 1220. Gateway 1210 may include a payment acquirer or Internet Service Provider. For example, the payment acquirer may be software hosted on a third-party server that handles transmissions between a merchant (represented by transaction devices 1202-1206) and an issuer 1230. In some embodiments, a gateway is associated with an acquiring bank (also referred to as a merchant bank). The acquiring bank is registered with a network 1220, wherein the network represents a card association or card scheme (e.g., Visa®, MasterCard®, American Express®, etc.). The acquiring bank contracts with merchants to create and maintain accounts allowing the merchant to accept accounts such as credit and debit cards. In some embodiments, gateway 1210 processes and encrypts the transaction data before routing the transaction data. In some embodiments, gateway 1210 groups one or more transactions together and sends the batch of transactions to issuer 1230 via network 1220.

Network 1220 is a platform for transmitting data between devices to support payment processing and electronic payments. In some embodiments, network 1220 is associated with a credit card association or card scheme (e.g., Visa®, MasterCard®, American Express®, etc.) and supports communications between association members such as an acquiring bank (e.g., gateway 1210) and an issuing bank (e.g., issuer 1230). In some embodiments, network 1220 implements a clearing house to provide clearing and settlement services. Network 1220 determines an appropriate destination to route the transaction data. For example, several issuer banks may be members of the network. The network determines the issuer corresponding to the transaction data and routes the transaction to the appropriate issuer. For simplicity, only one issuer 1230 is shown in FIG. 12. In some embodiments, network 1220 filters the received transaction data. For example, network 1220 may be aware of fraudulent accounts and determine whether the received transaction data includes a fraudulent account. Network 1220 may include one or more network connected servers for processing, routing, and/or facilitating transactions.

Issuer 1230 receives transaction data from network 1220 and determines whether to approve or deny a transaction (e.g., a provided account/payment). For example, issuer 1230 includes one or more servers/systems of an issuing bank. In some embodiments, the issuer is associated with an acquiring bank via network 1220. In some embodiments, determining whether to approve or deny an account/payment method includes determining whether the transaction is potentially fraudulent.

Storage 1244 stores information about transactions. Storage 1244 can be implemented by or include a variety of storage devices including devices for a memory hierarchy (cache, RAM, ROM, disk). In some embodiments, storage 1244 stores a list of potentially fraudulent transactions, a list (e.g., blacklist) of stolen/fraudulent accounts or other entities, and/or observed outcomes (e.g., labels) of previous transactions. The transaction information can be provided as a single transaction or a list of transactions. In some embodiments, a list of (past) transactions is stored in storage 1244 for a predetermined time, and is used to analyze subsequently-received transactions to provide output.

A payment verification process may take place within the environment shown in FIG. 12. In operation, a transaction device (1202, 1204, and/or 1206) receives transaction information such as account, time, amount, etc. as further described herein. In some embodiments, the transaction device processes the transaction information (e.g., packages the data). The transaction device sends the transaction data to gateway 1210. Gateway 1210 routes the received transaction data to network 1220. Network 1220 determines an issuer based on the transaction data, and sends the transaction data to the issuer. Issuer 1230 determines whether to approve or deny the transaction and detects system problems or unusual flows of transactions based on the transaction data and a security process performed by one or more nodes 1242.1, 1242.2. One or more nodes 1242.1, 1242.2 performs security processes to analyze the received transaction data and identify anomalies. The processes shown in FIGS. 4 and 8-11 are examples of security processes performed by cluster 1240.

Network 1220 and gateway 1210 relay an approval or decline notice back to the transaction device. If the transaction is approved, payment has been accepted and the transaction is successful. If the transaction is declined, payment has not been accepted and the transaction is declined.

In some embodiments, nodes of cluster 1240 are controlled and managed by issuer 1230. For example, devices/systems of the issuer or payment processing network retain transaction information and perform analysis to identify potentially fraudulent transactions. For example, the one or more nodes may be provided within the computing environment of issuer 1230. In some embodiments, nodes of cluster 1240 are controlled and managed by a third party. For example, issuer 1230 has contracted with the third party to perform analysis using data provided to the issuer (e.g., transaction information) to identify for the issuer likely potentially fraudulent transactions.

FIG. 13 is a functional diagram illustrating a programmed computer system for automated rules management in accordance with some embodiments. As will be apparent, other computer system architectures and configurations can be used to perform the described rules management techniques. Computer system 1300, which includes various subsystems as described below, includes at least one microprocessor subsystem (also referred to as a processor or a central processing unit (CPU) 1302). For example, processor 1302 can be implemented by a single-chip processor or by multiple processors. In some embodiments, processor 1302 is a general purpose digital processor that controls the operation of the computer system 1300. In some embodiments, processor 1302 also includes one or more coprocessors or special purpose processors (e.g., a graphics processor, a network processor, etc.). Using instructions retrieved from memory 1310, processor 1302 controls the reception and manipulation of input data received on an input device (e.g., image processing device 1306, I/O device interface 1304), and the output and display of data on output devices (e.g., display 1318).

Processor 1302 is coupled bi-directionally with memory 1310, which can include, for example, one or more random access memories (RAM) and/or one or more read-only memories (ROM). As is well known in the art, memory 1310 can be used as a general storage area, a temporary (e.g., scratch pad) memory, and/or a cache memory. Memory 1310 can also be used to store input data and processed data, as well as to store programming instructions and data, in the form of data objects and text objects, in addition to other data and instructions for processes operating on processor 1302. Also as is well known in the art, memory 1310 typically includes basic operating instructions, program code, data, and objects used by the processor 1302 to perform its functions (e.g., programmed instructions). For example, memory 1310 can include any suitable computer readable storage media described below, depending on whether, for example, data access needs to be bi-directional or uni-directional. For example, processor 1302 can also directly and very rapidly retrieve and store frequently needed data in a cache memory included in memory 1310.

A removable mass storage device 1312 provides additional data storage capacity for the computer system 1300, and is optionally coupled either bi-directionally (read/write) or uni-directionally (read only) to processor 1302. A fixed mass storage 1320 can also, for example, provide additional data storage capacity. For example, storage devices 1312 and/or 1320 can include computer readable media such as magnetic tape, flash memory, PC-CARDS, portable mass storage devices such as hard drives (e.g., magnetic, optical, or solid state drives), holographic storage devices, and other storage devices. Mass storages 1312 and/or 1320 generally store additional programming instructions, data, and the like that typically are not in active use by the processor 1302. It will be appreciated that the information retained within mass storages 1312 and 1320 can be incorporated, if needed, in standard fashion as part of memory 1310 (e.g., RAM) as virtual memory.

In addition to providing processor 1302 access to storage subsystems, bus 1314 can be used to provide access to other subsystems and devices as well. As shown, these can include a display 1318, a network interface 1316, an input/output (I/O) device interface 1304, an image processing device 1306, as well as other subsystems and devices. For example, image processing device 1306 can include a camera, a scanner, etc.; I/O device interface 1304 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1300. Multiple I/O device interfaces can be used in conjunction with computer system 1300. The I/O device interface can include general and customized interfaces that allow the processor 1302 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1316 allows processor 1302 to be coupled to another computer, computer network, or telecommunications network using a network connection as shown. For example, through the network interface 1316, the processor 1302 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 13 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1304 and display 1318 share the touch sensitive screen component, which both detects user inputs and displays outputs to the user). In addition, bus 1314 is illustrative of any interconnection scheme serving to link the subsystems. Other computer architectures having different configurations of subsystems can also be utilized.

Experimental results in real-world clients (e.g., big online merchants) indicate that the techniques disclosed herein can be applied to maintain the original system (i.e., one that does not use the disclosed rules management techniques) performance using only a fraction of the original rules (around 50% in one case to maintain 95% of the original system's recall, and around 20% in the other case to maintain the original system's low FPR).

Conventional rules management systems typically lack one or more of the following: rule priorities, rule actions, blacklists, scalability, and support for a user-defined loss function. For example, conventional rules management systems typically do not support a user-defined loss function meaning a client (e.g., a merchant or a bank) and thus are unable to optimize a fraud detection system for desired metrics (e.g., recall or a combination of metrics). Conventional rules management systems typically do not consider rule priorities. Systems that use rule weights in which each rule has a weight corresponding to its contribution to a fraud score are typically slower than the disclosed system which can deactivate/activate a rule based on priorities.

The rules management techniques disclosed herein improve decision making systems such as fraud detection systems or anti-money laundering systems by being able to effectively and efficiently handle many instances/transactions (on the order of millions in seconds or less) while supporting evaluation of rule sets with various rule actions, rule priorities, user-defined loss function, and blacklists. In some embodiments, the rules management system optimizes existing rule systems without needing to learn new rules which can be more computationally efficient than systems that depend on learning new rules. Nevertheless, the rules management system can be applied after another system learns new rules.

Although the examples discussed herein use the example of a fraud detection prediction system, this is not intended to be limiting and the disclosed automated rules management techniques can be applied to many different prediction systems. For example, the automated rules management technique can be designed to comply with domain-specific requirements, such as handling different actions (e.g., accept, alert, and decline for fraud detection), priorities, blacklists, and large datasets (e.g., on the order of hundreds of rules and millions of transactions for fraud detection). The automated rules management system finds application in other contexts involving rules such as recommendation systems, predictions systems, and the like.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting possibly fraudulent financial transactions by optimizing rules for evaluating possible fraud, wherein the rules comprise a rule set configured to meet a risk profile specified by a financial entity having responsibility to detect fraud, the method comprising:

configuring a processor to execute instructions stored on a non-transitory data storage device, wherein the instructions are configured to detect a possibly fraudulent transaction initiated by a purchaser using a purchaser computing device in electronic communication with a seller computing device, wherein the processor is associated with a computing device of the financial entity and is configured to implement the steps of the optimizing, comprising:

receiving, by the processor, a specification of past predicted results of an initial set of evaluation rules and corresponding observed outcomes, wherein:
the initial set of evaluation rules is applicable to evaluate a transaction for possible fraud and to determine an action to take with respect to the transaction,
each rule in the initial set of evaluation rules has an activation state, a priority, and an action,
the priority of each rule in the initial set of evaluation rules determines a precedence of a respective rule relative to other rules in the set of evaluation rules, and
the precedence is based on rule dependencies applicable to the initial set of evaluation rules;

evaluating, by the processor, performance of the initial set of evaluation rules and a contribution of an individual rule to the performance of the set, wherein:
the evaluating comprises calculating performance metrics specified by the financial entity,
the calculating is based on transaction analysis over a window of time and a comparison of the past predicted results of the initial rule set with the observed outcomes, and
the performance is based at least on a rate of false negatives or false positives being below a predetermined threshold;

receiving, by an optimizer generated by the processor, an output of the performance evaluation, the output comprising an indication of performance of the initial set of evaluation rules;

modifying, by the optimizer, based on the evaluation output, one or more sets of alternative activations or priorities of at least a portion of the rules of the initial set of evaluation rules such that the precedence of at least one rule changes with respect to at least one other rule in the set of evaluation rules, wherein the optimizer balances performance with processing speed and iteratively applies one or more optimization algorithms to maximize performance to meet predetermined optimization parameters;

generating, by the optimizer, a modified set of evaluation rules having one or more sets of alternative activations or priorities of at least a portion of the set of evaluation rules;

re-evaluating, by the processor, the modified set of evaluation rules, wherein the re-evaluation comprises comparing the performance of the modified rule set with the performance of the initial rule set; and re-optimizing, by the optimizer, based on the comparing, wherein the re-optimization comprises modifying activations or priorities of at least a portion of the modified set of evaluation rules based at least in part on the re-evaluation of the one or more sets of alternative activations or priorities such that the modified set of evaluation rules meets a loss function specified by the financial entity.

2. The method of claim 1, further comprising assessing the specification of past predicted results of the initial set of evaluation rules including by comparing a past predicted result of at least one of the initial set of evaluation rules with a corresponding observed outcome.

3. The method of claim 1, wherein the observed outcomes are based at least in part on a chargeback or an applied label.

4. The method of claim 1, wherein the evaluation rules are configured to be applied to data to determine a predicted result with respect to the data.

5. The method of claim 4, wherein the data includes streaming data.

6. The method of claim 1, wherein the one or more sets of alternative activations of at least a portion of the evaluation rules includes a de-activated rule that is not applied on data.

7. The method of claim 1, wherein determining one or more sets of alternative priorities of at least a portion of the evaluation rules includes randomly shuffling priorities of the evaluation rules.

8. The method of claim 1, wherein determining one or more sets of alternative activations or priorities of at least a portion of the evaluation rules includes:
cloning at least a portion of the evaluation rules to preserve the same triggers for the cloned at least a portion of evaluation rules; and
assigning a different priority to at least one of the cloned evaluation rules.

9. The method of claim 1, wherein the determined one or more sets of alternative activations or priorities includes one or more deactivations and the re-optimization includes:
determining a second set of alternative activations, deactivations, or priorities of at least a portion of the evaluation rules; and
comparing performance of the second set of alternative activations, deactivations, or priorities of at least a portion of the evaluation rules with the one or more sets of alternative activations or priorities of at least a portion of the evaluation rules to determine a better performing set of activations, deactivations, or priorities of at least a portion of the evaluation rules.

10. The method of claim 1, wherein the re-optimized modified activations includes one or more deactivations and the re-optimizing includes:
updating a population of rule configurations including by evaluating a previous population of rule configurations and selecting survivors; and
updating the population of rule configurations including by performing at least one of: a mutation or a crossover.

11. The method of claim 1, wherein modifying the one or more sets of alternative activations or priorities of at least a portion of the rules of the initial set of evaluation rules includes determining rule dependencies blacklists including by:
determining dependencies between at least a portion of the evaluation rules; and
re-optimizing the evaluation rules based at least in part on the determined dependencies between at least a portion of the evaluation rules.

12. The method of claim 1, further comprising updating a machine learning model using the re-optimized modified activations or priorities.

13. The method of claim 1, further comprising determining an action to take with respect to a transaction based at least in part on the re-optimized modified activations or priorities.

14. A method for detecting possibly fraudulent financial transactions by optimizing rules for evaluating possible fraud, wherein the rules comprise a rule set configured to meet a risk profile specified by a financial entity having responsibility to detect fraud, the method comprising:
configuring a processor to execute instructions stored on a non-transitory data storage device, wherein the instructions are configured to detect a possibly fraudulent transaction initiated by a purchaser using a purchaser computing device in electronic communication with a seller computing device, wherein the processor is associated with a computing device of the financial entity and is configured to implement the steps of the optimizing, comprising:
receiving, by the processor, a specification of past predicted results of a set of evaluation rules and corresponding observed outcomes;
determining dependencies between at least a portion of the evaluation rules, wherein:
the set of evaluation rules is applicable to evaluate a transaction for possible fraud and to determine an action to take with respect to the transaction,
each rule in the set of evaluation rules has an activation state, a priority, and an action,
the priority of each rule in the set of evaluation rules determines a precedence of a respective rule relative to other rules in the set of evaluation rules, and
the precedence is based on the determined dependencies applicable to the set of evaluation rules;
evaluating, by the processor, performance of the set of evaluation rules and a contribution of an individual rule to the performance of the set, wherein:
the evaluating comprises calculating performance metrics specified by the financial entity,
the calculating is based on transaction analysis over a window of time and a comparison of the past predicted results of the initial rule set with the observed outcomes, and
the performance is based at least on a rate of false negatives or false positives being below a predetermined threshold;

receiving, by an optimizer generated by the processor, an output of the performance evaluation, the output comprising an indication of performance of the set of evaluation rules; and re-optimizing, by the optimizer, based on the received output of the performance evaluation, wherein the re-optimization comprises modifying the set of evaluation rules based at least in part on the determined dependencies between at least a portion of the set of evaluation rules such that the modified set of evaluation rules meets a loss function specified by the financial entity.

15. The method of claim 14, wherein the set of evaluation rules are associated with a blacklist.

16. The method of claim 14, wherein determining dependencies between at least a portion of the set of evaluation rules includes:
   determining that a first rule depends on a second rule if the second rule caused the first rule to trigger.

17. The method of claim 16, wherein the first rule includes a blacklist checker rule and the second rule includes a blacklist updater rule.

18. A system for detecting possibly fraudulent financial transactions by optimizing rules for evaluating possible fraud, wherein the rules comprise a rule set configured to meet a risk profile specified by a financial entity having responsibility to detect fraud, the system comprising:
   a processor configured to execute instructions stored on a non-transitory data storage device, wherein the instructions are configured to detect a possibly fraudulent transaction initiated by a purchaser using a purchaser computing device in electronic communication with a seller computing device, wherein the processor is associated with a computing device of the financial entity and is configured to implement the steps of the optimizing, comprising:
      receive a specification of past predicted results of an initial set of evaluation rules and corresponding observed outcomes, wherein:
         the initial set of evaluation rules is applicable to evaluate a transaction for possible fraud and to determine an action to take with respect to the transaction,
         each rule in the initial set of evaluation rules has an activation state, a priority, and an action,
         the priority of each rule in the initial set of evaluation rules determines a precedence of a respective rule relative to other rules in the set of evaluation rules, and
         the precedence is based on rule dependencies applicable to the initial set of evaluation rules;
      evaluate performance of the initial set of evaluation rules and a contribution of an individual rule to the performance of the set, wherein:
         the evaluating comprises calculating performance metrics specified by the financial entity,
         the calculating is based on transaction analysis over a window of time and a comparison of the past predicted results of the initial rule set with the observed outcomes, and
         the performance is based at least on a rate of false negatives or false positives being below a predetermined threshold;
      receive, by an optimizer generated by the processor, an output of the performance evaluation, the output comprising an indication of performance of the initial set of evaluation rules;

modify, based on the evaluation output, one or more sets of alternative activations or priorities of at least a portion of the rules of the initial set of evaluation rules such that the precedence of at least one rule changes with respect to at least one other rule in the set of evaluation rules, wherein the optimizer balances performance with processing speed and iteratively applies one or more optimization algorithms to maximize performance to meet predetermined optimization parameters;
   generate, by the optimizer, a modified set of evaluation rules having one or more sets of alternative activations or priorities of at least a portion of the set of evaluation rules;
   re-evaluate the modified set of evaluation rules, wherein the re-evaluation comprises comparing the performance of the modified rule set with the performance of the initial rule set; and
   re-optimize, by the optimizer, based on the comparing, wherein the re-optimization comprises modifying activations or priorities of at least a portion of the modified set of evaluation rules based at least in part on the re-evaluation of the one or more sets of alternative activations or priorities such that the modified set of evaluation rules meets a loss function specified by the financial entity; and
   the non-transitory data storage device coupled to the processor and configured to provide the processor with the instructions.

19. A computer program product embodied in a non-transitory computer readable storage medium and comprising computer instructions for:
   receiving a specification of past predicted results of an initial set of evaluation rules and corresponding observed outcomes, wherein:
      the initial set of evaluation rules is applicable to evaluate a transaction for possible fraud and to determine an action to take with respect to the transaction,
      each rule in the initial set of evaluation rules has an activation state, a priority, and an action,
      the priority of each rule in the initial set of evaluation rules determines a precedence of a respective rule relative to other rules in the set of evaluation rules, and
      the precedence is based on rule dependencies applicable to the initial set of evaluation rules;
   evaluating performance of the initial set of evaluation rules and a contribution of an individual rule to the performance of the set, wherein:
      the evaluating comprises calculating performance metrics specified by a financial entity,
      the calculating is based on transaction analysis over a window of time and a comparison of the past predicted results of the initial rule set with the observed outcomes, and
      the performance is based at least on a rate of false negatives or false positives being below a predetermined threshold;
   receiving, by an optimizer generated by the processor, an output of the performance evaluation, the output comprising an indication of performance of the initial set of evaluation rules;
   modifying, based on the evaluation output, one or more sets of alternative activations or priorities of at least a portion of the rules of the initial set of evaluation rules such that the precedence of at least one rule changes with respect to at least one other rule in the set of evaluation rules, wherein the optimizer balances performance with processing speed and iteratively applies one or more optimization algorithms to maximize performance to meet predetermined optimization parameters;
generating, by the optimizer, a modified set of evaluation rules having one or more sets of alternative activations or priorities of at least a portion of the set of evaluation rules;
re-evaluating the modified set of evaluation rules, wherein the re-evaluation comprises comparing the performance of the modified rule set with the performance of the initial rule set; and
re-optimizing, by the optimizer, based on the comparing, wherein the re-optimization comprises modifying activations or priorities of at least a portion of the modified set of evaluation rules based at least in part on the re-evaluation of the one or more sets of alternative activations or priorities such that the modified set of evaluation rules meets a loss function specified by the financial entity.

\* \* \* \* \*

UNITED STATES PATENT AND TRADEMARK OFFICE
CERTIFICATE OF CORRECTION

PATENT NO. : 11,403,644 B2
APPLICATION NO. : 16/898816
DATED : August 2, 2022
INVENTOR(S) : David Oliveira Aparício et al.

Page 1 of 1

It is certified that error appears in the above-identified patent and that said Letters Patent is hereby corrected as shown below:

In the Specification

In Column 15, Line(s) 21, after "p$^{best}$", insert --.--.

In Column 15, Line(s) 23, before "activate", delete "$\mathbb{R}$".

Signed and Sealed this
Twenty-third Day of May, 2023

Katherine Kelly Vidal
*Director of the United States Patent and Trademark Office*